US012804567B2

(12) United States Patent
Luetzenkirchen

(10) Patent No.: US 12,804,567 B2
(45) Date of Patent: Nov. 17, 2026

(54) METHODS AND APPARATUS FOR BANDWIDTH EFFICIENT CONFIGURATION OF TIME SYNCHRONIZATION SERVICES IN 5G SYSTEMS

(71) Applicant: INTEL CORPORATION, Santa Clara, CA (US)

(72) Inventor: Thomas Luetzenkirchen, Taufkirchen (DE)

(73) Assignee: Intel Products IP LLC, Santa Clara, CA (US)

( * ) Notice: Subject to any disclaimer, the term of this patent is extended or adjusted under 35 U.S.C. 154(b) by 234 days.

(21) Appl. No.: 18/572,692

(22) PCT Filed: Sep. 19, 2022

(86) PCT No.: PCT/US2022/044005
§ 371 (c)(1),
(2) Date: Dec. 20, 2023

(87) PCT Pub. No.: WO2023/049076
PCT Pub. Date: Mar. 30, 2023

(65) Prior Publication Data
US 2024/0292348 A1 Aug. 29, 2024

Related U.S. Application Data

(60) Provisional application No. 63/246,286, filed on Sep. 20, 2021.

(51) Int. Cl.
*H04W 56/00* (2009.01)
*H04L 43/0817* (2022.01)
*H04W 76/25* (2018.01)

(52) U.S. Cl.
CPC ....... *H04W 56/001* (2013.01); *H04L 43/0817* (2013.01); *H04W 76/25* (2018.02)

(58) Field of Classification Search
CPC ........................... H04W 56/001; H04W 76/25; H04L 43/0817; H04L 67/14; H04L 65/80;
(Continued)

(56) References Cited

U.S. PATENT DOCUMENTS

2020/0351973 A1 11/2020 Mannweiler et al.
2023/0092723 A1 * 3/2023 Qu .................... H04W 28/0268
(Continued)

FOREIGN PATENT DOCUMENTS

WO WO-2021094236 A1 * 5/2021 ........... H04L 67/147

OTHER PUBLICATIONS

Network to TSN translator (TT) protocol aspects; stage 3 (Release 17) Jun. 2021 (Year: 2021).*
(Continued)

*Primary Examiner* — Mewale A Ambaye
(74) *Attorney, Agent, or Firm* — Gray Ice Higdon, PLLC

(57) ABSTRACT

The disclosure is directed to a wireless network including a method for a network node supporting time synchronization services in a wireless time sensitive communication (TSC) network, including initiating a network port management procedure for time synchronization services by exchanging information including port management information and user plane node management information with a centralized network configuration (CNC), the port management information related to one or more ports located in a device side time sensitive network (TSN) translator (DS-TT) in a user equipment and a network-side TNS translator (NW-TT) in a network node, encoding information related to port management parameter values to be read, set and deleted by the DS-TT and the NW-TT, and transmitting a deletion operation of a plurality of port management parameter entries at the one or more ports in the DS-TT and the NW-TT.

16 Claims, 8 Drawing Sheets

(58) Field of Classification Search
CPC . H04L 65/75; H04L 65/1016; H04L 65/1063; H04J 3/12
See application file for complete search history.

(56) References Cited

U.S. PATENT DOCUMENTS

| | | | | |
|---|---|---|---|---|
| 2023/0239816 | A1* | 7/2023 | Moon | H04W 56/001 370/350 |
| 2023/0319743 | A1* | 10/2023 | Joseph | H04W 56/001 370/329 |
| 2024/0214098 | A1* | 6/2024 | Moon | H04J 3/12 |

OTHER PUBLICATIONS

International Preliminary Report on Patentability mailed Apr. 4, 2024 in Application No. PCT/US2022/044005, 10 pages.
International Search Report and Written Opinion for PCT/US2022/044005, mailed Jan. 10, 2023, 12 pages.
3GPP, TSG CT, 5G System (SGS), Network to TSN translator (TT) protocol aspects, Stage 3 (Release 17), 3GPP TS 24.539 V17.1.0, 92 pages, Jul. 1, 2021.
3GPP, TSG SA, System architecture for the 5G System (SGS), Stage 2 (Release 17), 3GPP TS 23.501 V17.1.1, 526 pages, Jun. 24, 2021.
Japanese Office Action for JP Application No. 2023-576330, dated Jun. 10, 2025, 15 pages.
Intel Corporation, 'Support for BMCA reporting and improved PTP instance configuration management', 3GPP TSG SA WG2 #146E S2-2105494, Aug. 19, 2021, 29 pages.

* cited by examiner

METHODS AND APPARATUS FOR BANDWIDTH EFFICIENT CONFIGURATION OF TIME SYNCHRONIZATION SERVICES IN 5G SYSTEMS

CROSS-REFERENCE TO RELATED APPLICATION(S)

This application is a U.S. National Stage Application under 35 U.S.C. 371 and claims the priority benefit of International Application No. PCT/US2022/044005, filed Sep. 19, 2022, which claims the benefit of U.S. Provisional Application No. 63/246,286, filed Sep. 20, 2021, the disclosures of which are incorporated by reference as set forth in full.

FIELD OF THE DISCLOSURE

This disclosure generally relates to field of wireless communications, and more particularly relates to methods and apparatus related to configurations of time synchronization services.

BACKGROUND

The next generation mobile networks, in particular Third Generation Partnership Project (3GPP) systems such as Fifth Generation (5G) and Long-Term Evolution (LTE) and the evolutions thereof, are among the latest cellular wireless technologies developed to deliver ten times faster data rates than LTE and are being deployed with multiple carriers in the same area and across multiple spectrum bands. What is needed are technologies that address time sensitive wireless communications that enable deterministic applications by both network nodes and user equipment.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

In terms of a general overview, this disclosure is generally directed to systems and methods for time sensitive communications in 5G systems.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

5G networks are becoming increasingly complex with the densification of millimeter wave small cells, and various new services that are characterized by high speed high data volume, low speed ultra-low latency, and infrequent transmitting low data volume from huge number of emerging smart devices, respectively. One aspect of 3GPP Rel-17 stage two work includes enhancements to the 5G System (5GS) to enable enhanced support of time-sensitive communication (TSC) and support for deterministic applications. Such applications enable use cases such as advanced robotics, cloud based gaming, industrial controls, real time media, remote control systems, autonomous vehicles, augmented reality and the like wherein applications require stringent reliability.

For such use cases, 3GPP SA2 supports additional time-synchronization options based on the Precision Time Protocol (PTP) defined in IEEE 1855 and IEEE 802.1AS. The support for configuration of PTP instances of type Boundary Clock (BC), Transparent Clock (TC) and a Time-aware system was added to 5GS. Rel-16 TSN Bridge configuration model based on port management information container (PMIC) and user plane node management information container (UMIC), which was previously known as bridge management information container (BMIC), which is reused and the data sets for PTP instance configuration are included in PMIC and UMIC.

Figure 1:
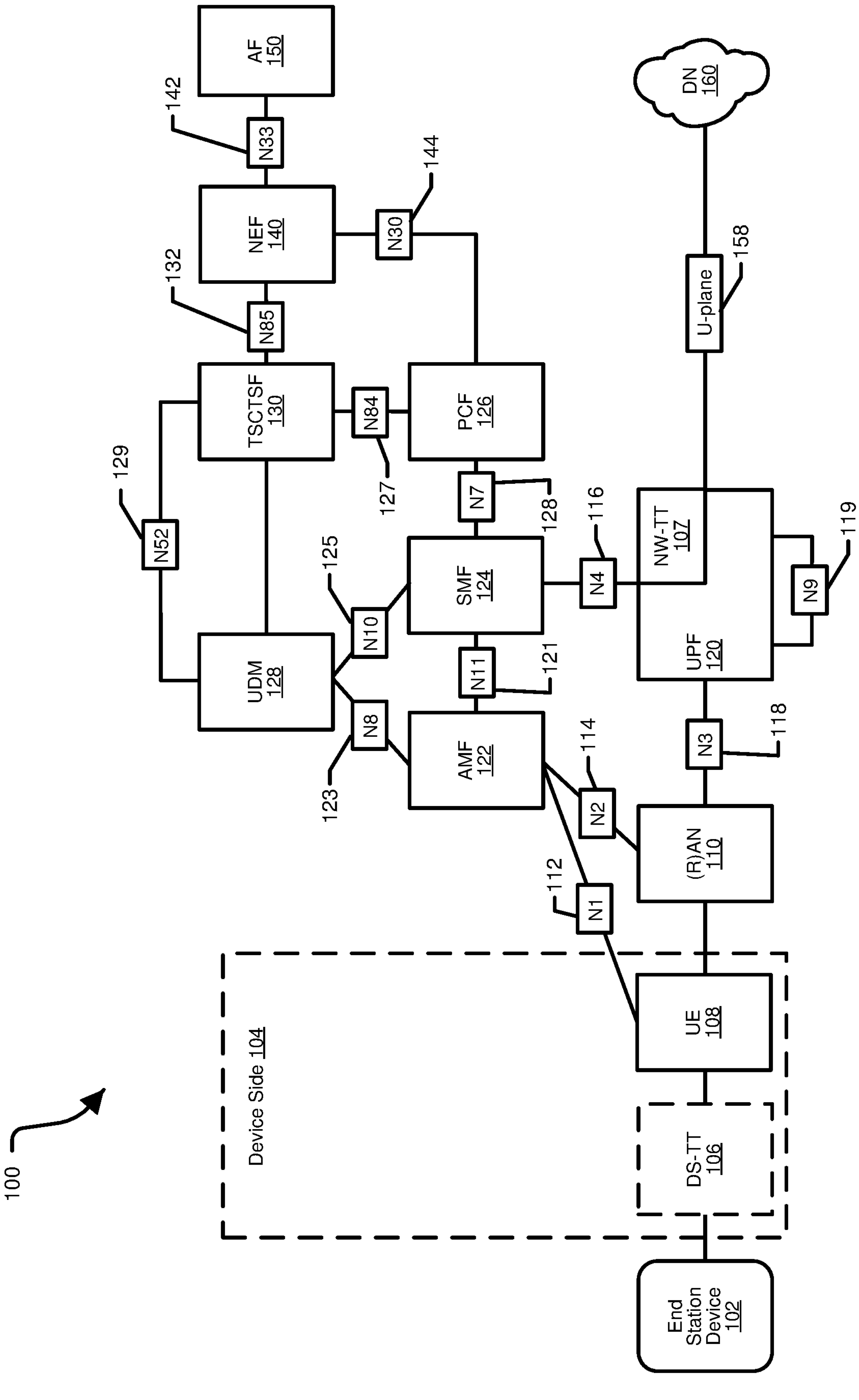
FIG. 1 illustrates an architecture that enable Time Sensitive Communication and Time Synchronization services in accordance with an embodiment of the disclosure.

Embodiments herein provide a network function, a Time Sensitive Communication and Time Synchronization Function (TSCSTF) 130 as illustrated in FIG. 1, which serves as another endpoint in addition to a time sensitive network application function (TSN AF not shown in FIG. 1) for the configuration of the PTP instances in NW-TT and DS-TT using PMIC and UMIC.

The stage 3 protocol inside PMIC and UMIC as specified in TS 24.539 supports management of port or user plane node management parameters using operations such read, write, and subscribe to parameter changes.

In one or more embodiments, methods include prevention of requiring read, write and subscribe for parameter changes from including the complete content of the parameter in PMIC and UMIC due to single byte changes. For example, if the complete PTP instance configuration of the DS-TT/NW-TT is modeled as single parameter, the amount of data to be transferred may be large and require high bandwidth on the air interface (N1 interface) and CN interfaces (N11, N7, N5 or N84) in case of DS-TT and CN interfaces (N4, N7, N5 or N84) interface in case of NW-TT.

According to one or more embodiments, improvements enable more efficient bandwidth usage for managing PTP instance configurations in 5GS. PTP instance configurations support a selective read operation, a selective write operation, a selective subscribe-notify to parameter changes operation, and a create and delete operation.

One or more embodiments include enhancements to the stage 3 protocol in TS 24.539 for bandwidth efficient configuration of Time Synchronization services in 5GS under the 3GPP Rel-17 work item industrial internet of things (IIoT).

Specifically, according to one or more embodiments, a method for read, write and subscribe parameter operations includes a stage 3 message for a precision time protocol instance configuration.

In one or more embodiments include supporting creation and deletion of parameter data structure instances to prevent a TSN AF (not shown in FIG. 1) or TSCSTF AF 130 from writing an entire data structure, which causes the transfer of a large amount of data. For example, in PTP instance configuration, parameter data structure instances of an entire data structure may require massive amounts of data.

One or more embodiments provide changes to TS 24.539 by enhancing Port management and User plane node management operations for supporting read, set, and subscribe using only a subset of parameter values. Thus, embodiments provide for support of only parameters containing instantiated data structures with named parameters without breaking backwards compatibility to Rel-16. The Rel-17 parameters of interest include a PTP instance list and DS-TT port time synchronization information list which are already supporting named parameters.

One or more embodiments provide for supporting dynamic creation and deletion of data structure instances for the management of PTP instance information.

More particularly, referring now to FIG. 1, a network architecture illustrates a 5G system that supports a TSCTSF function. Within a 5G system, a time sensitive communication and time synchronization function (TSCTSF) 130 interacts with policy control function (PCF) via network policy control function Npcf_PolicyAuthorization service to collect the time synchronization capabilities supported by a 5G bridge, such as precision time protocol (PTP) instance type, transport protocol, PTP profiles, grandmaster mode, access stratum timing source and the like.

Architecture 100 provides time synchronization configurations requested by AF to a 5G bridge such as PTP instance type, PTP profile, a 5G system acting as grandmaster clock and its grand master (GM) priority, clock domain(s), 5G air interface time synchronization error budget, synchronization service temporal and validity so that the 5G system either transports external grandmaster clock PTP synchronization packets or distributes 5G access stratum time as grandmaster clock to external nodes.

As shown, architecture 100 shows End station device 102, which could be any type of end station compatible with 5G services. Within a device side 104 are device side time sensitive network translator (DS-TT) 106 and user equipment (UE) 108. DS-TT may be part of user equipment (UE) 108 as a logical block. Radio access network (RAN) 110 is shown coupled to a device side 104, coupled to user plane function (UPF) 120 with network side time sensitive network translator (NW-TT) 107.

FIG. 1 further illustrates network interfaces that connect user interface (UE) 108, RAN 110 and different control plane functions. As will be appreciated, network interfaces shown follow procedures to establish, maintain and release different RAN and packet data to perform intra-radio access technology (RAT) handover and inter-RAT handover and separation of each UE on a protocol level for user specific signaling management, the transfer of non-access stratum (NAS) signaling messages and different mechanisms for resource reservation for packet data streams.

Network interfaces are further illustrated including N1 interface 112 shown between UE 108 and access and mobility management function (AMF) 122, N2 interface 114 shown between RAN 110 and AMF 122, and N3 interface shown between RAN 110 and UPF 120. AMF 122 is shown coupled to session management function (SMF) 124. AMF 122 is also coupled to unified data management (UDM) 128. Network interface N11 121 is shown between AMF 122 and SMF 124, network interface N8 123 is shown between AMF 122 and UDM 128; and network interface N10 125 is between SMF 124 and UDM 128.

Also shown is policy control function (PCF) 126 coupled to SMF 124 with network interface N7 128 between PCF 126 and SMF 124. UDM 128 is shown coupled to time sensitive communication and time synchronization function (TSCTSF) 130 with network interface N52 129 shown between them. PCF 126 is also coupled to TSCTSF 130 with network interface 127 between. PCF 126 is coupled to network exposure function (NEF) 140 with network interface N30 144 between. TSCTSF 130 is coupled to NEF 140 with network interface 132 between. NEF 140 is coupled to application function (AF) 150 with network interface N33 between. In some embodiments a time sensitive network AF (TSN AF not shown in FIG. 1) coupled to PCF 126 with network interface N5 (not shown in FIG. 1) may include or be coupled to a centralized network configuration (CNC) on a control plane that enables one or more embodiments herein.

User plane function (UPF) 120 is shown coupled to data network (DN) 160 with User plane 158 between.

With respect to embodiments provided herein, changes to 3GPP TS 24.539 are supported. Specifically, section 5.2.1.1 includes a network-requested port management procedure is to enable a time sensitive network application function to a) obtain the list of port management parameters supported by the DS-TT; b) obtain the current values of port management parameters at the DS-TT port; c) set the values of port management parameters at the DS-TT port; d) delete the values of port management parameters at the DS-TT port; e) subscribe to be notified by the DS-TT if the values of certain port management parameters change at the DS-TT port; or f) unsubscribe to be notified by the DS-TT for one or more port management parameters.

Embodiments herein enable deletion of values of port management parameters a DS-TT port to enable time sensitive transmissions with smaller data structures to enable faster transmissions.

Referring to Section 5.2.1.2, Network-requested port management procedure initiation embodiments further enable time sensitive network to avoid transmitting excessive data by reducing data structure sizes. More particularly, to initiate the network-requested port management procedure, the TSN AF shall encode the information about the port management parameters values to be read, the port management parameters values to be set, the port management parameter values to be deleted, the port management parameters changes to subscribe (or unsubscribe) to and whether the TSN AF requests the list of port management parameters supported by the DS-TT in an port management list IE and include it in a MANAGE PORT COMMAND message.

Section 5.2.1.2 further provides for sending the MANAGE PORT COMMAND message to the UE 108 via the PCF 126 and the SMF 124 and starting a timer T100.

Figure 2A:
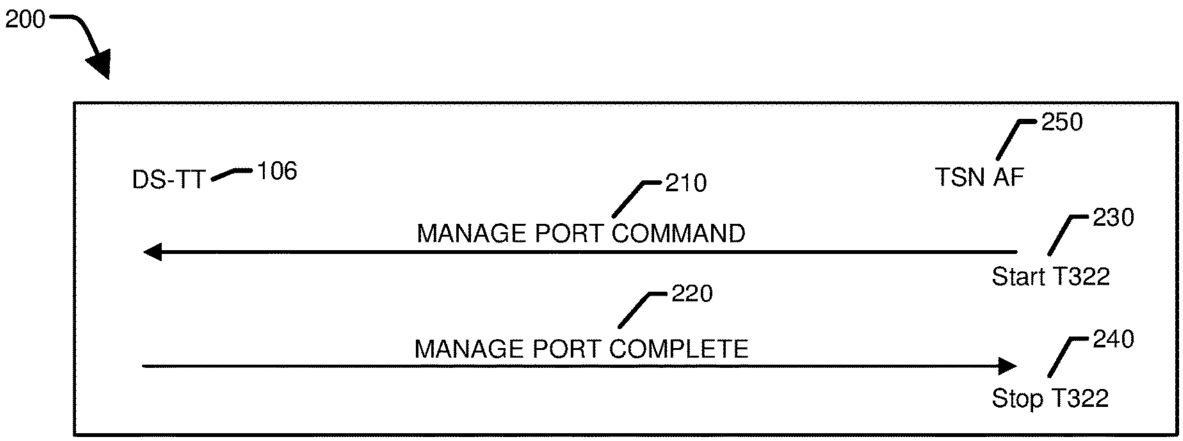
FIG. 2A illustrates a message flow from a time sensitive network application function (TSN AF) to a device side time sensitive network translator (DS-TT) 106 in accordance with various embodiments of this disclosure.

Thus, as shown in FIG. 2A, timing diagram 200 shows DS-TT 106 receives a MANAGE PORT COMMAND 210 from TSN AF 250 and sends back MANAGE PORT COMPLETE message 220. Times start T322 230 and stop T322 240 are also illustrated.

Section 5.2.1.3 provides for network-requested port management procedure completion. This section provides that upon receipt of the MANAGE PORT COMMAND message, for each operation included in the port management list information element, that the DST-TT shall perform actions based on operation codes received from the TSN AF.

For example, operation codes may include "get capabilities", "read parameter", "set parameter", "subscribe-notify for parameter", and "unsubscribe for parameter". Each of the operation codes according to embodiments herein may include smaller data structures to make time sensitive communications more efficient.

Specifically, "sub-parameters" also referred to as parameter value subsets are introduced in accordance with one or more embodiments. Thus, embodiments provide for actions taken for operation codes involving sub-parameters and provide for the following actions taken at the DS-TT port.

If the operation code is "selective read parameter", attempt to read the value of the selected sub-parameter(s) of the parameter at the DS-TT port.

If the value of the selected sub-parameter(s) at the DS-TT port is read successfully, include the parameter with the selected sub-parameter(s) and their current value in the port status information element of the MANAGE PORT COMPLETE message.

If the value of the selected sub-parameter(s) at the DS-TT port was not read successfully, include the parameter and associated port management service cause value in the port status IE of the MANAGE PORT COMPLETE message.

If the operation code is "selective subscribe-notify for parameter", store the request from the TSN AF to be notified of changes in the value of the corresponding selected sub-parameter(s) of the parameter.

If the operation code is "selective unsubscribe for parameter", delete the stored request from the TSN AF to be notified of changes in the value of the corresponding selected sub-parameter(s) of the parameter, if any.

If the operation code is "selective unsubscribe for parameter", the stored requests from the TSN AF to be notified of changes in the value of sub-parameters are deleted only for the sub-parameters included in the parameter value field. If the operation code is "unsubscribe for parameter", the stored requests from the TSN AF to be notified of changes in the value of sub-parameters are deleted for all sub-parameters of the parameter.

The MANAGE PORT COMPLETE message 220 shown in FIG. 2A illustrates where the actions are reflected as the DS-TT prepares the message based on the operation codes.

Figure 2B:
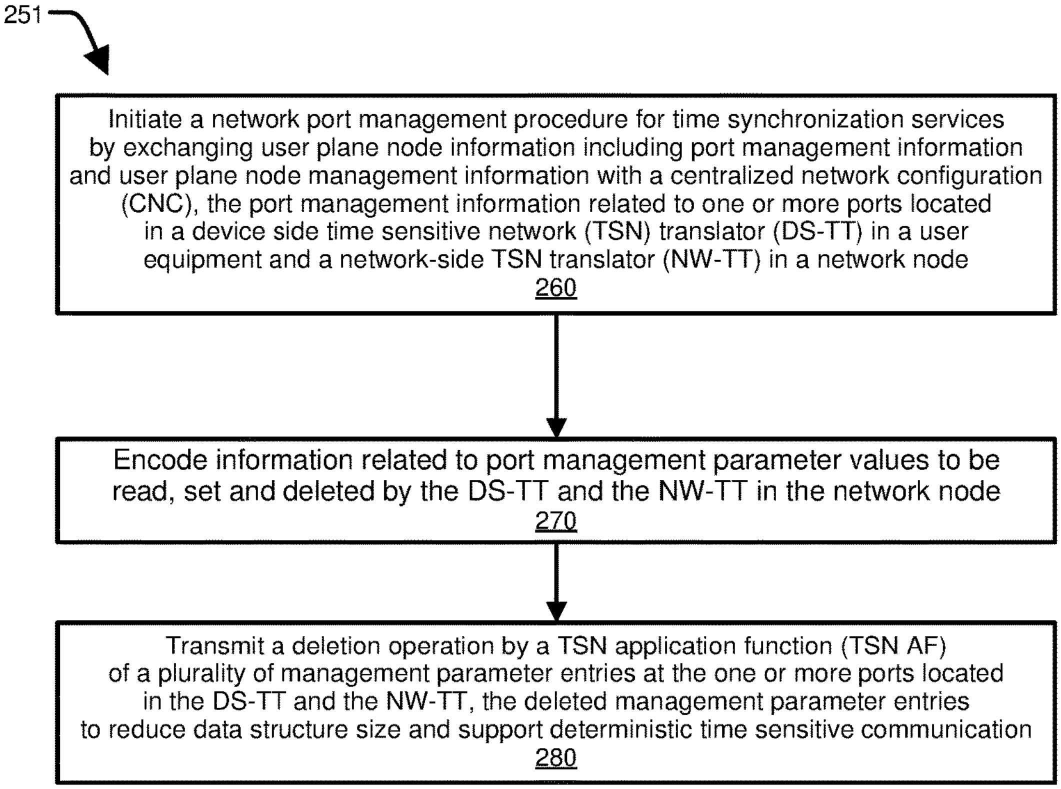
FIG. 2B illustrates a flow diagram of a method in accordance with various embodiments of this disclosure.

Referring now to FIG. 2B, a flow diagram illustrates a method in accordance with one or more embodiments. Specifically, as shown, flow diagram 251 provides a method for a network node supporting synchronization services in a wireless time sensitive communication network. Block 260 provides for initiating a network port management procedure for time synchronization services by exchanging user plane node information including port management information and user plane node management information with a centralized network configuration (CNC), the port management information related to one or more ports located in a device side time sensitive network (TSN) translator (DS-TT) in a user equipment and a network-side TSN translator (NW-TT) in a network node. For example, the TSN AF exchanges port management information via control plane (PCF, SMF, AMF or UPF) with NW-TT 107 and DS-TT 106 associated with UE 108.

Block 270 provides for encoding information related to port management parameter values to be read, set and deleted by the DS-TT and the NW-TT in the network node. For example, a network node and UE 108 may encode information.

Block 280 provides for transmitting a deletion operation by a TSN application function (TSN AF) of a plurality of management parameter entries at the one or more ports located in the DS-TT and the NW-TT, the deleted management parameter entries to reduce data structure size and support deterministic time sensitive communication. For example, a TSN AF may trigger a delete operation by instructing different ports in DS-TT 106 or NW-TT 107.

Figure 3:
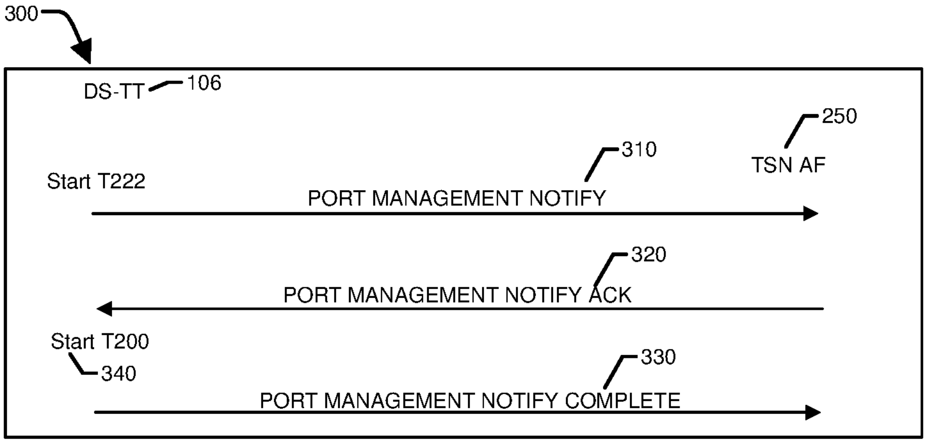
FIGS. 3-6 illustrate message flows between TSN AF and a DS-TT or a network side time sensitive network translator (NW-TT) in accordance with various embodiments of this disclosure.

Referring now to FIG. 3, DS-TT 106 and TSN AF 250 transmit messages PORT MANAGMENT NOTIFY 310 at start time T222 330, PORT MANAGEMENT NOTIFY ACK 320, AND PORT MANAGEMENT NOTIFY COMPLETE 330, at start time T200 340.

In one or more embodiments, a method for a TSN AF requested port management procedure enables a TSN AF to delete values of port management parameters at the NW-TT port. More specifically, Section 6.2.1.1 and 6.2.1.2 direct that the TSN AF encode the information about the port management parameters values to be read, the port management parameters values to be set, the port management parameters changes to (un)subscribe to, the port management parameter-entry to be deleted and whether the TSN AF requests the list of port management parameters supported by the NW-TT in a port management list information element as specified in clause 9.2 and include it in a MANAGE PORT COMMAND message, send the MANAGE PORT COMMAND message to the NW-TT via the PCF and the SMF as specified in 3GPP TS 23.502 and start Timer T100.

Figure 4:
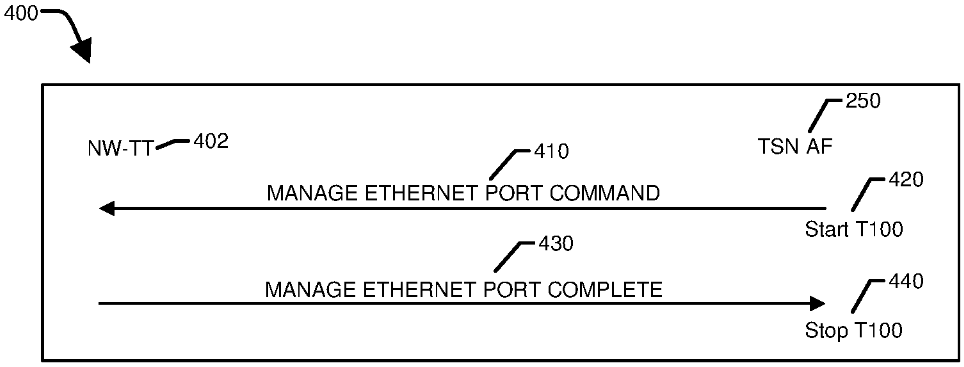

Embodiments enable more efficient transmissions by providing that the port management parameter-entry to be deleted be encoded by the TSN AF. The message sent from the TSN AF in a MANAGE ETHERNET PORT COMMAND shown in FIG. 4 illustrates a NW-TT 402 and TSN AF 250 sending the MANAGE ETHERNET PORT COMMAND 410 at T100 420 and receiving the MANAGE ETHERNET PORT COMPLETE 430 message at stop T100 440. In accordance with embodiments, the MANAGE ETHERNET PORT COMPLETE will have all values of the port management parameters deleted at the NW-TT port.

Another embodiment is directed to Section 6.2.1.3 TSN AF requested port management procedure completion. In accordance with one or more embodiments, a method for a MANAGE PORT COMMAND message to an NW-TT from a TSN AF may include providing for a parameter subset selector at NW-TT port within a network node.

More specifically, in one or more embodiments, a method includes responding to TSN AF operation codes by responding to cooperation codes such that:

if the operation code is "read parameter subset", attempt to read the parameter value subset identified by parameter subset selector at the NW-TT port;

if the parameter value subset at the NW-TT port is read successfully, include the parameter and the current parameter value subset in the port status information element of the MANAGE PORT COMPLETE message;

if the parameter value subset at the NW-TT port was not read successfully, include the parameter and the associated port management service cause value in the port status IE of the MANAGE PORT COMPLETE message;

if the operation code is "set parameter subset", attempt to set the parameter value subset at the NW-TT port to the value specified in the operation while keeping NW-TT parameter value not included in the request untouched, if any, and if the parameter value subset at the NW-TT port is set successfully, include the current parameter value subset in the port update result IE of the MANAGE PORT COMPLETE message; and if the parameter value subset at the NW-TT port was not set successfully, include the parameter and associated port management service cause value in the port update result IE of the MANAGE PORT COMPLETE message;

if the operation code is "subscribe-notify for parameter subset", store the request from the TSN AF to be notified of changes in the parameter value subset identified by parameter subset selector. Any "subscribe-notify for parameter" or "subscribe-notify for parameter subset" request for the same parameter previously stored at the NW-TT port will be replaced with the new request;

if the operation code is "delete parameter subset", attempt to delete the parameter value subset identified by parameter subset selector at the NW-TT port, if available; and send the MANAGE PORT COMPLETE to the TSN AF via the SMF and the PCF as specified in 3GPP TS 23.502.

Another embodiment is directed to Section 6.2.2.2 NW TT initiated port management procedure initiation. To initiate the NW-TT initiated port management procedure, the NW-TT creates a PORT MANAGEMENT NOTIFY message.

Specifically, the NW-TT in one or more embodiments, creates a message and includes a value subset identified by a parameter subset selector stored at the NW-TT and reports in the port status information element of a PORT MANAGEMENT NOTIFY message.

Figure 5:
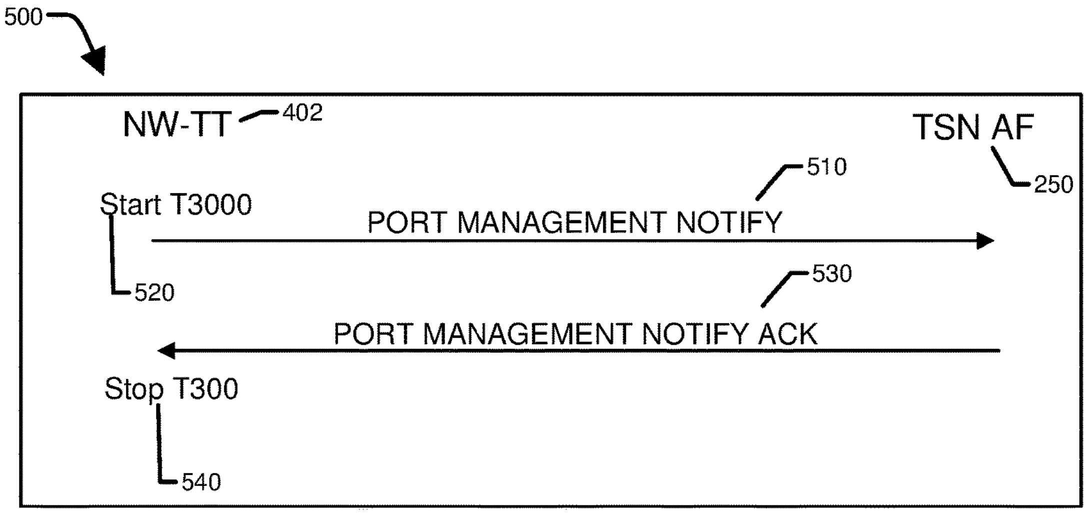

The PORT MANAGEMENT NOTIFY 510 message is sent as shown in FIG. 5 to the TSN AF 250 via the SMF and the PCF. As shown, NW-TT 402 sends at Start T300 520 message PORT MANAGEMENT NOTIFY 510 as modified according to embodiments herein is received at TSN AF 250 and TSN AF 250 replies with PORT MANAGEMENT NOTIFY ACK 530 to NW-TT 402 at Stop T300 540.

Another embodiment is directed to Section 6.3.1.1 and 6.3.1.2, TSN AF requested user plane node management procedure to enable TSN AF to delete values of user plane node management parameters at the NW-TT.

More particularly, a TSN AF requested user plane node management procedure enables a TSN AF to obtain a list of user plane node management parameters supported at NW-TT, obtain the current values of user plane node management parameters at the NW-TT, set the values of user plane node management parameters at the NW-TT, delete the values of user plane node management parameters at the NW-TT port, subscribe to be notified by the NW-TT if the values of certain user plane node management parameters change at the NW-TT, or unsubscribe to be notified by the NW-TT for one or more user plane node management parameters.

In accordance with embodiments, the TSN AF requested user plane node management procedure method includes that the TSN AF shall:

encode the information about the user plane node management parameters values to be read, the user plane node management parameters values to be set, the user plane node parameter values to be deleted, the user plane node management parameters changes to subscribe (or unsubscribe) to and whether the TSN AF requests the list of user plane node management parameters supported by the NW-TT in an User plane node management list information element and include it in a MANAGE USER PLANE NODE COMMAND message;

send the MANAGE USER PLANE NODE COMMAND message to the NW-TT via the PCF and the SMF.

Figure 6:
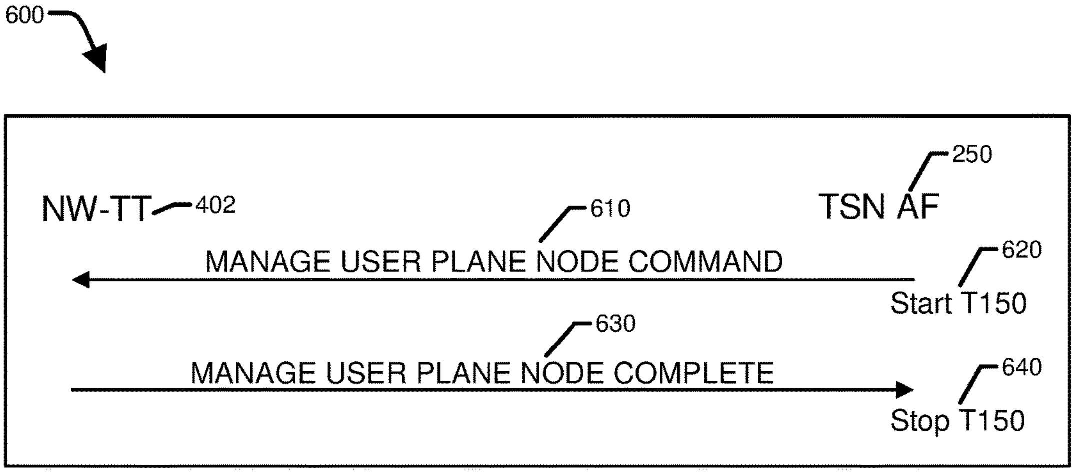

The MANAGE USER PLANE NODE COMMAND 610 message is sent as shown in FIG. 6 from the TSN AF 250 to NW-TT 402 at Start T150 620. NW-TT 402 sends back MANAGE USER PLANE NODE COMPLETE 630 message back to TSN AF 250 at Stop time T150 640.

Another embodiment is directed to Section 6.3.1.3 TSN AF requested user plane node management procedure completion that provides for a method upon receipt of the MANAGE USER PLANE NODE COMMAND, message, for each operation included in a user plane node management list IE, the NW-TT shall:

if the operation code is "get capabilities", include the list of User plane node management parameters supported by the NW-TT in the User plane node management capability information element of the MANAGE USER PLANE NODE COMPLETE message;

if the operation code is "read parameter", attempt to read the value of the user plane node management parameter at the NW-TT, and if the value of the parameter at the NW-TT is read successfully, include the parameter and its current value in the User plane node status IE of the MANAGE USER PLANE NODE COMPLETE message; and if the value of the parameter at the NW-TT was not read successfully, include the parameter and associated User plane node management service cause value in the user plane node status information element of the MANAGE USER PLANE NODE COMPLETE message;

if the operation code is "set parameter", attempt to set the value of the user plane node management parameter at the NW-TT to the value specified in the operation, and:

if the value of the parameter at the NW-TT is set successfully, include the parameter and its current value in the User plane node update result information element of the MANAGE USER PLANE NODE COMPLETE message; and if the value of the parameter at the NW-TT was not set successfully, include the parameter and associated user plane node management service cause value in the User plane node update result information element of the MANAGE USER PLANE NODE COMPLETE message;

if the operation code is "subscribe-notify for parameter", store the request from the TSN AF to be notified of changes in the value of the corresponding user plane node management parameter;

if the operation code is "unsubscribe for parameter", delete the stored request from the TSN AF to be notified of changes in the value of the corresponding user plane node management parameter, if any;

in accordance with one or more embodiments herein, if the operation code is "read parameter subset", attempt to read the parameter value subset identified by parameter subset selector at the NW-TT;

in accordance with one or more embodiments herein, if the parameter value subset at the NW-TT is read successfully, include the parameter and the current parameter value subset in the User plane node status IE of the MANAGE USER PLANE NODE COMPLETE message; and in accordance with one or more embodiments herein, if the parameter value subset at the NW-TT was not read successfully, include the parameter and the associated User plane node service cause value in the User plane node status information element of the MANAGE USER PLANE NODE COMPLETE message;

in accordance with one or more embodiments herein, if the operation code is "set parameter subset", attempt to set the parameter value subset at the NW-TT to the value specified in the operation while keeping NW-TT parameter value not included in the request untouched, if any, and in accordance with one or more embodiments herein, if the parameter value subset at the NW-TT is set successfully, include the current parameter value subset in the User plane node update result information element of the MANAGE USER PLANE NODE COMPLETE message; and in accordance with one or more embodiments herein, if the parameter value subset at the NW-TT was not set successfully, include the parameter and associated User plane node management service cause value in the User plane node update result information element of the MANAGE USER PLANE NODE COMPLETE message;

in accordance with one or more embodiments herein, if the operation code is "subscribe-notify for parameter subset", store the request from the TSN AF to be notified of changes in the parameter value subset identified by parameter subset selector, any "subscribe-notify for parameter" or "subscribe-notify for parameter subset" request for the same parameter previously stored at the NW-TT will be replaced with the new request;

in accordance with one or more embodiments herein, if the operation code is "delete parameter subset", attempt to delete the parameter value subset identified by parameter subset selector at the NW-TT, if available; and send the MANAGE USER PLANE NODE COMPLETE to the TSN AF via the SMF 124 and the PCF 126, Another embodiment is directed to Section 6.3.2.2 NW-TT initiated user plane node management procedure initiation methods. More particularly, to initiate the NW-TT initiated user plane node management procedure, the NW-TT creates a USER PLANE NODE MANAGEMENT NOTIFY message and shall:

include the User plane node management parameters to be reported to the TSN AF with their current value or value subset (identified by parameter subset selector stored at the NW-TT) in the User plane node status IE of the USER PLANE NODE MANAGEMENT NOTIFY message;

start timer T350; and send the USER PLANE NODE MANAGEMENT NOTIFY message to the TSN AF via the SMF and the PCF.

Specifically, in one or more embodiments, there is a parameter subset selector stored at the NW-TT that identifies value subsets for reporting purposes.

Figure 7A:
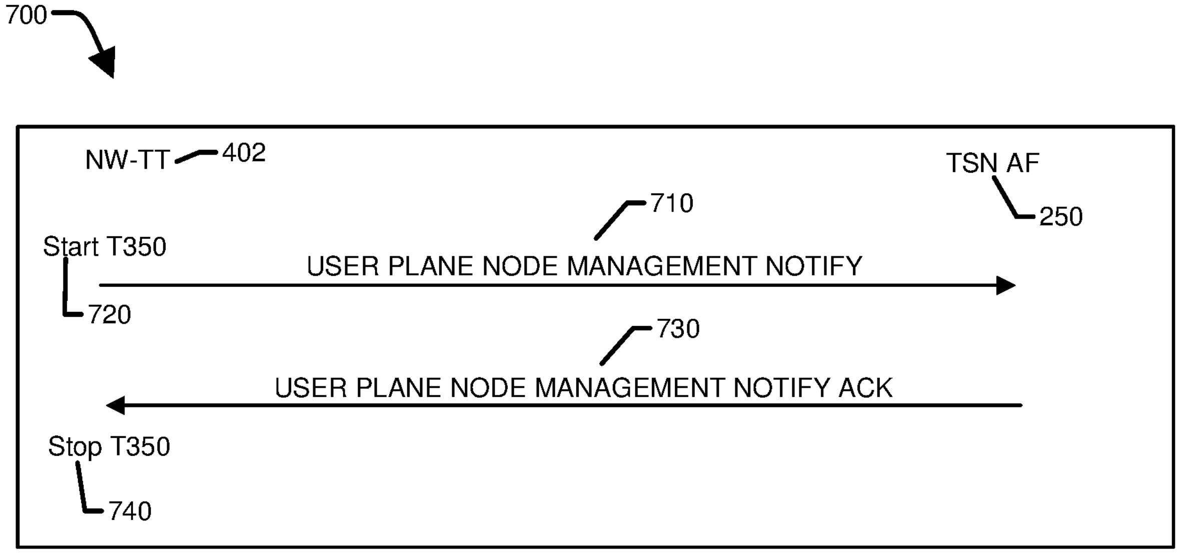
FIG. 7A illustrates message flow between NW-TT and TSN AF of a user plane node management notify message.

In accordance with embodiments the messages are sent as shown in FIG. 7. As shown, NW-TT 402 ends USER PLANE NODE MANAGEMENT NOTIFY 710 message at start T350 720 to TSN AF 250. TSN AF 250 responds with USER PLANE NODE MANAGEMENT NOTIFY ACK 730 received at Stop time T350 740.

Another embodiment is directed to Section 9.2 Port Management List which has a purpose of transferring from the TSN AF to the DS TT or NW-TT a list of operations related to port management of the DS-TT or NW-TT to be performed.

In one or more embodiments, the port management list information element has a minimum length of 4 octets and a maximum length of 65535 octets.

In accordance with one or more embodiments, Table 1 illustrates a port management list information element.

TABLE 1

| 8 7 6 5 4 3 2 1 | |
|---|---|
| Port Management List Information Element | Octet 1 |
| Length of Port Management List Contents | Octet 2 |
| | Octet 3 |
| Port Management List Contents | Octet 4 |
| | Octet Z |

In accordance with one or more embodiments, Table 2 illustrates a port management list contents.

TABLE 2

| 8 7 6 5 4 3 2 1 | |
|---|---|
| Operation 1 | Octet 4 |
| | Octet a |
| Operation 2 | Octet a + 1 |
| | Octet b* |
| . . . | Octet b + 1* |
| | Octet c |
| Operation N | Octet c + 1* |
| | Octet z |

In accordance with one or more embodiments, Table 3 illustrates an operation for operation code set to "00000001".

TABLE 3

| 8 7 6 5 4 3 2 1 | |
|---|---|
| Operation Code | Octet d |
| Port Parameter Name | Octet d + 1 |
| | Octet d + 2 |

In accordance with one or more embodiments, Table 4 illustrates an operation for operation code set to "00000010", "00000100", or "00000101".

TABLE 4

| 8 | 7 | 6 | 5 | 4 | 3 | 2 | 1 | |
|---|---|---|---|---|---|---|---|---|
| Operation Code | | | | | | | | Octet d |
| Port Parameter Name | | | | | | | | Octet d + 1 |
| | | | | | | | | Octet d + 2 |
| Length of Port Parameter Value | | | | | | | | Octet d + 3 |
| | | | | | | | | Octet d + 4 |
| Port Parameter Value | | | | | | | | Octet d + 5 |
| | | | | | | | | Octet e |

In accordance with one or more embodiments, Table 5 illustrates an operation for operation code set to "00000110", "00001000", or "00001001".

In particular, one or more embodiments are directed to a parameter subset selector with a length and a parameter subset selector value as shown.

TABLE 5

| 8 | 7 | 6 | 5 | 4 | 3 | 2 | 1 | |
|---|---|---|---|---|---|---|---|---|
| Operation Code | | | | | | | | Octet d |
| Port Parameter Name | | | | | | | | Octet d + 1 |
| | | | | | | | | Octet d + 2 |
| Length of Parameter Subset Selector | | | | | | | | Octet d + 3 |
| | | | | | | | | Octet d + 4 |
| Parameter Subset Selector Value | | | | | | | | Octet d + 5 |
| | | | | | | | | Octet e |

In accordance with one or more embodiments, Table 6 illustrates a port element list information element.

TABLE 6

| Value of the port management list information elements (octets 4 to z)<br>The value of the port management list information element consists of one or multiple operations<br>Operation<br>Operation code (octet d) | |
|---|---|
| Bits | |
| 8 7 6 5 4 3 2 1 | |
| 0 0 0 0 0 0 0 0 | Reserved |
| 0 0 0 0 0 0 0 1 | Get Capabilities |
| 0 0 0 0 0 0 1 0 | Read Parameter |
| 0 0 0 0 0 0 1 1 | Set Parameter |
| 0 0 0 0 0 1 0 0 | Subscribe-notify for Parameter |
| 0 0 0 0 0 1 0 1 | Unsubscribe for Parameter |
| 0 0 0 0 0 1 1 0 | Read Parameter Subset |
| 0 0 0 0 0 1 1 1 | Set Parameter Subset |
| 0 0 0 0 1 0 0 0 | Subscribe-notify for Parameter Subset |
| 0 0 0 0 1 0 0 1 | Delete Parameter Subset |
| All other values are spare | |
| Port parameter name (octets d + 1 to d + 2) | |

In one or more embodiments, the length of a parameter subset selector is represented by (octets d+3 to d+4).

The parameter subset selector field may contain the binary encoding of the length of the parameter subset selector value.

Parameter subset selector value (octet d+5 to e).

When the port parameter name indicates capital PTP instance list, the parameter subset selector value field contains the value part of the PTP instance list information element containing one or more PTP instances with PTP instance identifier set to the selected PTP instance. Each PTP instance includes zero or more PTP instance parameters with PTP instance parameter name set to the selected PTP instance parameter and length of PTP instance parameter always set to zero. If no PTP instance parameter is included in a specific PTP instance the entire PTP instances selected with all PTP instance parameters stored at the DS-TT or NW-TT port.

In accordance with one or more embodiments, Note 3 in the table 6 above provides that the "read parameter subset," operation the "set parameter subset" operation the "subscribe-notify for parameter subset" operation and the "delete parameter subset" operation shall be applicable only for the following port parameter names: 00E9H PTP instance list.

Another embodiment is directed to Section 9.5 Port update result wherein a parameter subset selector is not supported.

More specifically, in one or more embodiments port update result element is to report to the TSN F the outcome of the request from the TS and AF to set one or more parameters to a specific value. In one or more embodiments the port update result element has a minimum length of five octets and a maximum length of 65534 octets.

In accordance with one or more embodiments, the port management service cause (octet i+2) Is a field containing the port management service cause indicating the reason why the value of the port parameter could not be set select successfully, encoded as bits:

8 7 6 5 4 3 2 1

0 0 0 0 0 0 1 1 representing a parameter subset selector not supported.

Another embodiment is directed to Section 9.5B related to a user plane node management list.

The purpose of the User plane node management list information element is to transfer from the TSN AF to the NW-TT a list of operations related to User plane node management of the NW-TT to be performed at the NW-TT.

The User plane node management list information element is coded as shown in Tables 7-12.

The User plane node management list information element has a minimum length of 4 octets and a maximum length of 65530 octets.

TABLE 7

| User plane node management list information element | | | | | | | | |
|---|---|---|---|---|---|---|---|---|
| 8 | 7 | 6 | 5 | 4 | 3 | 2 | 1 | |
| User Plane Node Management List Information Element | | | | | | | | Octet 1 |
| Length of User Plane Node Management List Contents | | | | | | | | Octet 2 |
| | | | | | | | | Octet 3 |
| User Plane Node Management List Contents | | | | | | | | Octet 4 |
| | | | | | | | | Octet z |

TABLE 8

| User Plane Node Management List Contents | | | | | | | | |
|---|---|---|---|---|---|---|---|---|
| 8 | 7 | 6 | 5 | 4 | 3 | 2 | 1 | |
| Operation 1 | | | | | | | | Octet 4 |
| | | | | | | | | Octet a |
| Operation 2 | | | | | | | | Octet a + 1 |
| | | | | | | | | Octet b |
| . . . | | | | | | | | Octet b + 1 |
| | | | | | | | | Octet c* |
| Operation N | | | | | | | | Octet c + 1* |
| | | | | | | | | Octet z* |

TABLE 9

| Operation for Operation Code Set to "00000001" | |
|---|---|
| 8 7 6 5 4 3 2 1 | |
| Operation Code | Octet d |

TABLE 10

| Operation for Operation Code Set to "00000010", "00000100" or "00000101" | |
|---|---|
| 8 7 6 5 4 3 2 1 | |
| Operation Code | Octet d |
| User Plane Node Parameter Name | Octet d + 1 |
| | Octet d + 2 |

TABLE 11

| Operation for Operation Code Set to "00000011" or "00000111": | |
|---|---|
| 8 7 6 5 4 3 2 1 | |
| Operation Code | Octet d |
| User Plane Node Parameter Name | Octet d + 1 |
| | Octet d + 2 |
| Length of User Plane Node Parameter Value | Octet d + 3 |
| | Octet d + 4 |
| User Plane Node Parameter Value | Octet d + 5 |
| | Octet e |

TABLE 12

| Operation for operation code set to "00000110", "00001000", or "00001001" | |
|---|---|
| 8 7 6 5 4 3 2 1 | |
| Operation Code | Octet d |
| User Plane Node Parameter Name | Octet d + 1 |
| | Octet d + 2 |
| Length of Parameter Subset Selector | Octet d + 3 |
| | Octet d + 4 |
| Parameter Subset Selector Value | Octet d + 5 |
| | Octet e |

One or more embodiments relate to the value part of the user plane node management list information element (octets 4 to Z). The value part of the user plane node management list information element consists of one or several operations.

Operation Code (Octet d)

Bits 8 7 6 5 4 3 2 1

0 0 0 0 0 1 1 0 Read parameter subset (Note 6)

0 0 0 0 0 1 1 1 Set parameter subset (Note 6)

0 0 0 0 1 0 0 0 Subscribe-notify for parameter subset (NOTE 6)

0 0 0 0 1 0 0 1 Delete parameter subset (NOTE 6)

Note 6 provides that the "read parameter subset" operation, "set parameter subset" operation, "subscribe-notify for a parameter subset" operation, and "delete parameter subset" operation shall be applicable only for the following parameter names: 007BH DS-TT port time synchronization information list.

Another embodiment is related to the length of parameter subset selector (octets d+3 to d+4).

This field contains the binary encoding of the length of the parameter subset selector value.

Parameter subset selector value (octet d+5 to e).

When the user plane node parameter name indicates DS-TT port time synchronization information list, the parameter subset selector value field contains the value part of the DS-TT port time synchronization information list information element as specified. It contains one or more DS-TT port time synchronization information instances with DS-TT port number set to the selected PTP instance. Each PTP instance includes zero or more PTP instance parameters with PTP instance parameter name set to the selected PTP instance parameter and length of PTP instance parameter always set to zero. If no PTP instance is included in a specific DS-TT port time synchronization information instance the entire DS-TT port time and synchronization information instance is selected with all PTP instances stored at the TT. If no PTP instance parameter is included in a specific PTP instance, the entire PTP instances selected with all PTP instance parameters stored at the end. In case of DS-TT port numbers set to zero (wild card value), they selected PTP instances and selected PTP instance parameters are selected in all DS-TT port time synchronization information instance is stored at the NW-TT.

Another embodiment is related to Section 9.5E User plane node update result. More particularly, in one embodiment a parameter subset selector is in existence but not supported bits for the field that contains the User plane node management.

More particularly, an embodiment provides that user plane node management service cause includes a field that contains user plane node management service cause indicating the reason why the value of the user plane node parameter could not be set successfully encoded as follows:

Bits:

8 7 6 5 4 3 2 1

0 0 0 0 0 0 1 1 Parameter subset selector not supported.

As shown, when parameter subset selector is not supported the bits may illustrate this issue in accordance with one or more embodiments.

Figure 7B:
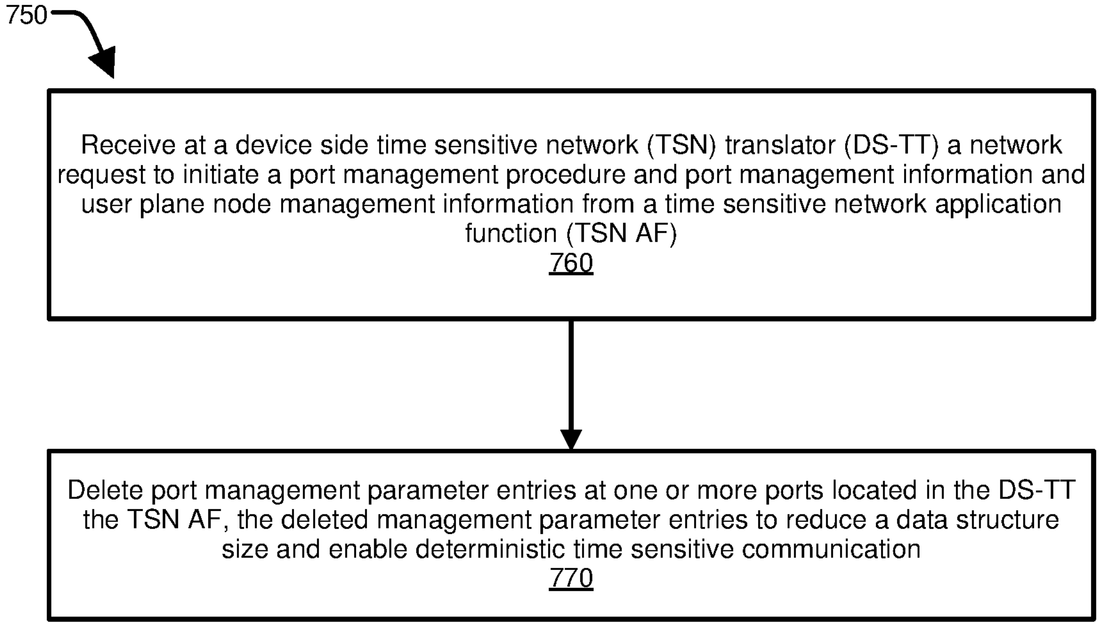
FIG. 7B flow diagram of a method in accordance with various embodiments of this disclosure.

Referring now to FIG. 7B, a flow diagram 750 illustrates a method for a user equipment in accordance with one or more embodiments. As shown block 760 provides for receiving at a device side time sensitive network (TSN) translator (DS-TT) a network request to initiate a port management procedure and port management information from a time sensitive network application function (TSN AF). For example, as shown in FIG. 1, UE 108 includes DS-TT 106 that interacts with the control plane (AMF, SMF, PCF) to initiate port management procedures from a TSN AF.

Block 770 provides for deleting port management parameter entries at one or more ports located in the DS-TT the TSN AF, the deleted port management parameter entries to reduce a data structure size and enable deterministic time sensitive communication. For example, TSCTSF 130 may delete entries at DS-TT 106 to reduce data structures sizes and enable deterministic time sensitive communications.

Systems and Implementations

Figure 8:
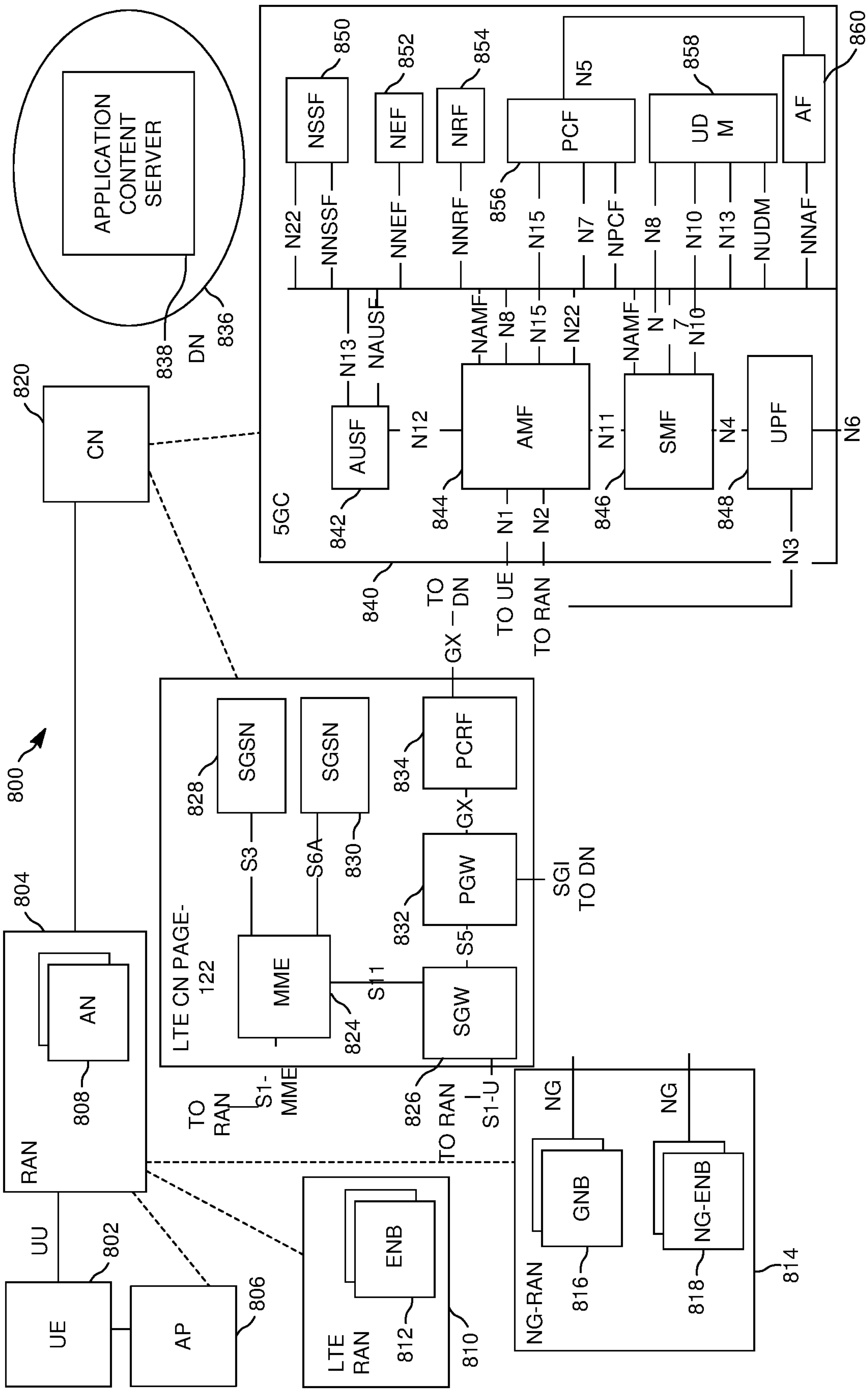
FIG. 8 illustrates an exemplary network in accordance with an embodiment of the disclosure.
Figure 9:
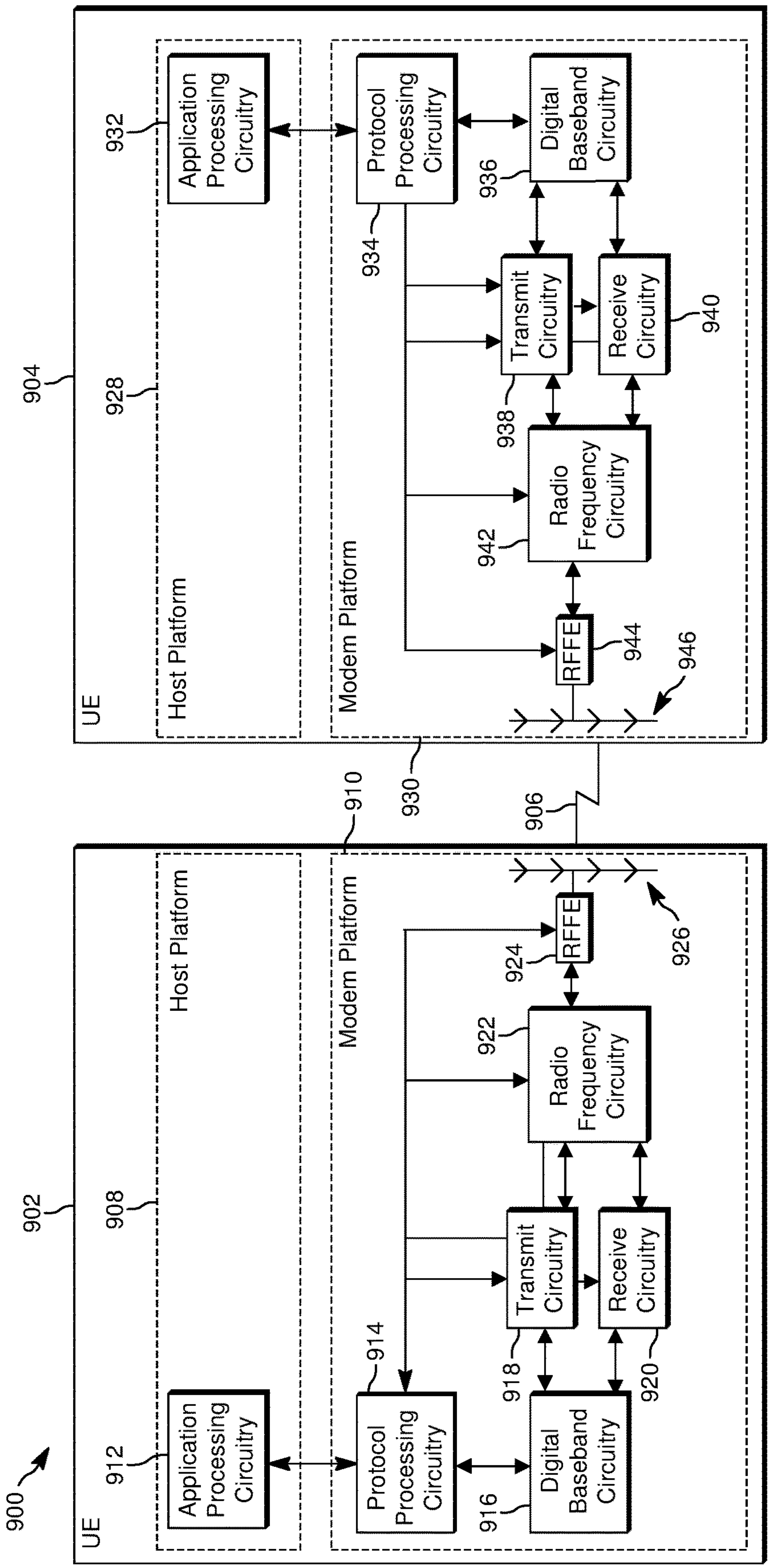
FIG. 9 illustrates an exemplary network in accordance with various embodiments of the disclosure.
Figure 10:
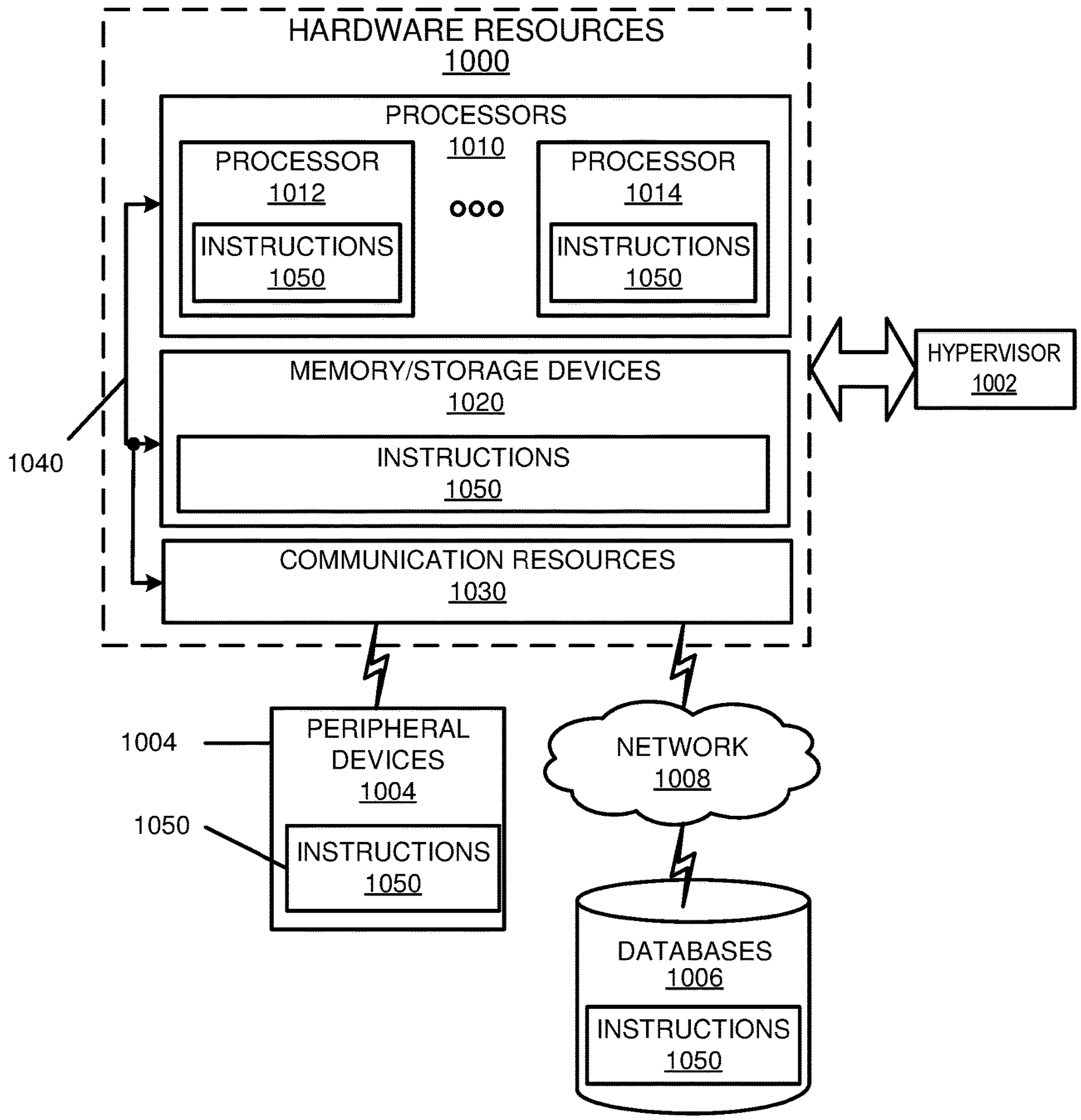
FIG. 10 illustrates an exemplary wireless network in accordance with various embodiments of the disclosure.

FIGS. 8-10 illustrate various systems, devices, and components that may implement aspects of disclosed embodiments.

FIG. 8 illustrates a network 800 in accordance with various embodiments. The network 800 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 800 may include a UE 802, which may include any mobile or non-mobile computing device designed to communicate with a RAN 804 via an over-the-air connection. The UE 802 may be communicatively coupled with the RAN 804 by a Uu interface. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 802 may additionally communicate with an AP 806 via an over-the-air connection. The AP 806 may manage a WLAN connection, which may serve to offload some/all network traffic from the RAN 804. The connection between the UE 802 and the AP 806 may be consistent with any IEEE 802.11 protocol, wherein the AP 806 could be a wireless fidelity (Wi-Fi®) router. In some embodiments, the UE 802, RAN 804, and AP 806 may utilize cellular-WLAN aggregation (for example, LWA/LWIP). Cellular-WLAN aggregation may involve the UE 802 being configured by the RAN 804 to utilize both cellular radio resources and WLAN resources.

The RAN 804 may include one or more access nodes, for example, AN 808. AN 808 may terminate air-interface protocols for the UE 802 by providing access stratum protocols including RRC, PDCP, RLC, MAC, and LI protocols. In this manner, the AN 808 may enable data/voice connectivity between CN 820 and the UE 802. In some embodiments, the AN 808 may be implemented in a discrete device or as one or more software entities running on server computers as part of, for example, a virtual network, which may be referred to as a CRAN or virtual baseband unit pool. The AN 808 be referred to as a BS, gNB, RAN node, eNB, ng-eNB, NodeB, RSU, TRxP, TRP, etc. The AN 808 may be a macrocell base station or a low power base station for providing femtocells, picocells or other like cells having smaller coverage areas, smaller user capacity, or higher bandwidth compared to macrocells.

In embodiments in which the RAN 804 includes a plurality of ANs, they may be coupled with one another via an X2 interface (if the RAN 804 is an LTE RAN) or an Xn interface (if the RAN 804 is a 8G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 804 may each manage one or more cells, cell groups, component carriers, etc. to provide the UE 802 with an air interface for network access. The UE 802 may be simultaneously connected with a plurality of cells provided by the same or different ANs of the RAN 804. For example, the UE 802 and RAN 804 may use carrier aggregation to allow the UE 802 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 804 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 802 or AN 808 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 804 may be an LTE RAN 810 with eNBs, for example, eNB 812. The LTE RAN 810 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-5 GHz bands.

In some embodiments, the RAN 804 may be an NG-RAN 814 with gNBs, for example, gNB 816, or ng-eNBs, for example, ng-eNB 818. The gNB 816 may connect with 5G-enabled UEs using a 5G NR interface. The gNB 816 may connect with a 5G core through an NG interface, which may include an N2 interface or an N3 interface. The ng-eNB 818 may also connect with the 5G core through an NG interface, but may connect with a UE via an LTE air interface. The gNB 816 and the ng-eNB 818 may connect with each other over an Xn interface.

In some embodiments, the NG interface may be split into two parts, an NG user plane (NG-U) interface, which carries traffic data between the nodes of the NG-RAN 814 and a UPF 848 (e.g., N3 interface), and an NG control plane (NG-C) interface, which is a signaling interface between the nodes of the NG-RAN 814 and an AMF 4544 (e.g., N2 interface).

The NG-RAN 814 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operate on FR1 bands that include sub-6 GHz bands or FR2 bands that include bands from 24.25 GHZ to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 802 can be configured with multiple BWPs where each BWP configuration has a different SCS. When a BWP change is indicated to the UE 802, the SCS of the transmission is changed as well. Another use case example of BWP is related to power saving. In particular, multiple BWPs can be configured for the UE 802 with different amount of frequency resources (for example, PRBs) to support data transmission under different traffic loading scenarios. A BWP containing a smaller number of PRBs can be used for data transmission with small traffic load while allowing power saving at the UE 802 and in some cases at the gNB 816. A BWP containing a larger number of PRBs can be used for scenarios with higher traffic load.

The RAN 804 is communicatively coupled to CN 820 that includes network elements to provide various functions to support data and telecommunications services to customers/subscribers (for example, users of UE 802). The components of the CN 820 may be implemented in one physical node or separate physical nodes. In some embodiments, NFV may be utilized to virtualize any or all of the functions provided by the network elements of the CN 820 onto physical compute/storage resources in servers, switches, etc. A logical instantiation of the CN 820 may be referred to as a network slice, and a logical instantiation of a portion of the CN 820 may be referred to as a network sub-slice.

In some embodiments, the CN 820 may be an LTE CN 822, which may also be referred to as an EPC. The LTE CN 822 may include MME 824, SGW 826, SGSN 828, HSS 830, PGW 832, and PCRF 834 coupled with one another over interfaces (or "reference points") as shown. Functions of the elements of the LTE CN 822 may be briefly introduced as follows.

The MME 824 may implement mobility management functions to track a current location of the UE 802 to facilitate paging, bearer activation/deactivation, handovers, gateway selection, authentication, etc.

The SGW 826 may terminate an S1 interface toward the RAN and route data packets between the RAN and the LTE CN 822. The SGW 826 may be a local mobility anchor point for inter-RAN node handovers and also may provide an anchor for inter-3GPP mobility. Other responsibilities may include lawful intercept, charging, and some policy enforcement.

The SGSN 828 may track a location of the UE 802 and perform security functions and access control. In addition, the SGSN 828 may perform inter-EPC node signaling for mobility between different RAT networks; PDN and S-GW selection as specified by MME 824; MME selection for handovers; etc. The S3 reference point between the MME 824 and the SGSN 828 may enable user and bearer information exchange for inter-3GPP access network mobility in idle/active states.

The HSS 830 may include a database for network users, including subscription-related information to support the network entities' handling of communication sessions. The HSS 830 can provide support for routing/roaming, authentication, authorization, naming/addressing resolution, location dependencies, etc. An S6a reference point between the HSS 830 and the MME 824 may enable transfer of subscription and authentication data for authenticating/authorizing user access to the LTE CN 820.

The PGW 832 may terminate an SGi interface toward a data network (DN) 836 that may include an application/content server 838. The PGW 832 may route data packets between the LTE CN 822 and the data network 836. The PGW 832 may be coupled with the SGW 826 by an S5 reference point to facilitate user plane tunneling and tunnel management. The PGW 532 may further include a node for policy enforcement and charging data collection (for example, PCEF). Additionally, the SGi reference point between the PGW 832 and the data network 836 may be an operator external public, a private PDN, or an intra-operator packet data network, for example, for provision of IMS services. The PGW 832 may be coupled with a PCRF 834 via a Gx reference point.

The PCRF 834 is the policy and charging control element of the LTE CN 822. The PCRF 834 may be communicatively coupled to the app/content server 838 to determine appropriate QoS and charging parameters for service flows. The PCRF 832 may provision associated rules into a PCEF (via Gx reference point) with appropriate TFT and QCI.

In some embodiments, the CN 820 may be a 4GC 840. The 5GC 840 may include an AUSF 842, AMF 844, SMF 846, UPF 848, NSSF 850, NEF 852, NRF 854, PCF 856, UDM 858, and AF 860 coupled with one another over interfaces (or "reference points") as shown. Functions of the elements of the 5GC 840 may be briefly introduced as follows.

The AUSF 842 may store data for authentication of UE 802 and handle authentication-related functionality. The AUSF 842 may facilitate a common authentication framework for various access types. In addition to communicating with other elements of the 5GC 840 over reference points as shown, the AUSF 842 may exhibit an Nausf service-based interface.

The AMF 844 may allow other functions of the 5GC 840 to communicate with the UE 802 and the RAN 804 and to subscribe to notifications about mobility events with respect to the UE 802. The AMF 844 may be responsible for registration management (for example, for registering UE 802), connection management, reachability management, mobility management, lawful interception of AMF-related events, and access authentication and authorization. The AMF 844 may provide transport for SM messages between the UE 802 and the SMF 846, and act as a transparent proxy for routing SM messages. AMF 844 may also provide transport for SMS messages between UE 802 and an SMSF. AMF 844 may interact with the AUSF 842 and the UE 802 to perform various security anchor and context management functions. Furthermore, AMF 844 may be a termination point of a RAN CP interface, which may include or be an N2 reference point between the RAN 804 and the AMF 844; and the AMF 844 may be a termination point of NAS (N1) signaling, and perform NAS ciphering and integrity protection. AMF 844 may also support NAS signaling with the UE 802 over an N3 IWF interface.

The SMF 846 may be responsible for SM (for example, session establishment, tunnel management between UPF 848 and AN 808); UE IP address allocation and management (including optional authorization); selection and control of UP function; configuring traffic steering at UPF 848 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 844 over N2 to AN 808; and determining SSC mode of a session. SM may refer to management of a PDU session, and a PDU session or "session" may refer to a PDU connectivity service that provides or enables the exchange of PDUs between the UE 802 and the data network 836.

The UPF 848 may act as an anchor point for intra-RAT and inter-RAT mobility, an external PDU session point of interconnect to data network 836, and a branching point to support multi-homed PDU session. The UPF 848 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 848 may include an uplink classifier to support routing traffic flows to a data network.

The NSSF 850 may select a set of network slice instances serving the UE 802. The NSSF 850 may also determine allowed NSSAI and the mapping to the subscribed S-NSSAIs, if needed. The NSSF 850 may also determine the AMF set to be used to serve the UE 802, or a list of candidate AMFs based on a suitable configuration and possibly by querying the NRF 854. The selection of a set of network slice instances for the UE 802 may be triggered by the AMF 844 with which the UE 802 is registered by interacting with the NSSF 850, which may lead to a change of AMF. The NSSF 850 may interact with the AMF 844 via an N22 reference point; and may communicate with another NSSF in a visited network via an N31 reference point (not shown). Additionally, the NSSF 850 may exhibit an Nnssf service-based interface.

The NEF 852 may securely expose services and capabilities provided by 3GPP network functions for third party, internal exposure/re-exposure, AFs (e.g., AF 460), edge computing or fog computing systems, etc. In such embodiments, the NEF 852 may authenticate, authorize, or throttle the AFs. NEF 852 may also translate information exchanged with the AF 860 and information exchanged with internal network functions. For example, the NEF 852 may translate between an AF-Service-Identifier and an internal 5GC information. NEF 852 may also receive information from other NFs based on exposed capabilities of other NFs. This information may be stored at the NEF 852 as structured data, or at a data storage NF using standardized interfaces. The stored information can then be re-exposed by the NEF 852 to other NFs and AFs, or used for other purposes such as analytics. Additionally, the NEF 852 may exhibit an Nnef service-based interface.

The NRF 854 may support service discovery functions, receive NF discovery requests from NF instances, and provide the information of the discovered NF instances to the NF instances. NRF 854 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 854 may exhibit the Nnrf service-based interface.

The PCF 856 may provide policy rules to control plane functions to enforce them, and may also support unified policy framework to govern network behavior. The PCF 856 may also implement a front end to access subscription information relevant for policy decisions in a UDR of the UDM 858. In addition to communicating with functions over reference points as shown, the PCF 856 exhibit an Npcf service-based interface.

The UDM 858 may handle subscription-related information to support the network entities' handling of communication sessions, and may store subscription data of UE 802. For example, subscription data may be communicated via an N8 reference point between the UDM 858 and the AMF 844. The UDM 858 may include two parts, an application front end and a UDR. The UDR may store subscription data and policy data for the UDM 858 and the PCF 856, and/or structured data for exposure and application data (including PFDs for application detection, application request information for multiple UEs 802) for the NEF 852. The Nudr service-based interface may be exhibited by the UDR 221 to allow the UDM 858, PCF 856, and NEF 852 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 858 may exhibit the Nudm service-based interface.

The AF 860 may provide application influence on traffic routing, provide access to NEF, and interact with the policy framework for policy control.

In some embodiments, the 5GC 840 may enable edge computing by selecting operator/3rd party services to be geographically close to a point that the UE 802 is attached to the network. This may reduce latency and load on the network. To provide edge-computing implementations, the 5GC 840 may select a UPF 848 close to the UE 802 and execute traffic steering from the UPF 848 to data network 836 via the N6 interface. This may be based on the UE subscription data, UE location, and information provided by the AF 860. In this way, the AF 860 may influence UPF (re)selection and traffic routing. Based on operator deployment, when AF 860 is considered to be a trusted entity, the network operator may permit AF 860 to interact directly with relevant NFs. Additionally, the AF 860 may exhibit an Naf service-based interface.

The data network 836 may represent various network operator services, Internet access, or third party services that may be provided by one or more servers including, for example, application/content server 838.

Referring now to FIG. 9, a schematic illustrates a wireless network 900 in accordance with various embodiments. The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-5 GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-5 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 949. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040 or other interface circuitry. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processors 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface controllers, components, or other suitable devices to communicate with one or more peripheral devices 1004 or one or more databases 1006 or other network elements via a network 1008. For example, the communication resources 1030 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example 1 may include a network node supporting time synchronization services in a wireless time sensitive communication (TSC) network comprising: a memory configured to store computer-executable instructions; and a processor coupled to the memory, the processor configured to access the memory and execute the computer-executable instructions to: initiate a network port management procedure for time synchronization services by exchanging user plane node information including port management information and user plane node management information with a centralized network configuration (CNC), the port management information related to one or more ports located in a device side time sensitive network (TSN) translator (DS-TT) in a user equipment and a network-side TNS translator (NW-TT) in a network node; encode information related to port management parameter values to be read, set and deleted by the DS-TT and the NW-TT in the network node; and a transceiver configured to receive time synchronization services; a transceiver coupled to the processor, the transceiver configured to transmit a deletion operation of a plurality of port management parameter entries at the one or more ports located in the DS-TT and the NW-TT, the deletion operation associated with reducing data structure size and supporting deterministic time sensitive communication.

Example 2 may include the network node of example 1 and/or any other example herein, wherein an application function (AF) is configured to initiate the network port management procedure by encoding information related to port management parameter values to be read, set and deleted in a MANAGE PORT COMMAND message to a user equipment using a policy control function (PCF) and a session management function (SMF).

Example 3 may include the network node of example 2 and/or any other example herein, wherein the TSN AF is configured to: transmit a MANAGE PORT COMMAND message to the user equipment DS-TT with one or more instructions including: if an operation code is "selective read parameter," attempt to read a value of a selected sub-parameter of a parameter at the DS-TT port, and: if a value of the selected sub-parameter at the DS-TT port is read successfully, include the value of the selected sub-parameter and a current value in a port status information element of a MANAGE PORT COMPLETE message; and, if the selected sub-parameter at the DS-TT port was not read successfully, include the parameter and an associated port management service cause value in the port status information element of the MANAGE PORT COMPLETE message.

Example 4 may include the network node of example 2 and/or any other example herein, wherein the AF is configured to: transmit a MANAGE PORT COMMAND message to the user equipment DS-TT with one or more instructions including: if an operation code is "subscribe-notify for parameter," store the network request from the AF to be notified of changes in the parameter value identified by a corresponding selected sub-parameter of the parameter; if the operation code is "selective-subscribe-notify for parameter," store the request from the AF to be notified of changes in the value of the corresponding selected sub-parameter of the parameter; and if the operation code is "selective unsubscribe for parameter," delete the stored request from the AF to be notified of changes in value of a corresponding selected sub-parameter of the parameter.

Example 5 may include the network node of example 1 or 2 and/or any other example herein, wherein the transmitting the deletion operation includes transmitting one or more instructions configured to: delete a port management parameter entry at a NW-TT port; and encode the port management information about port management parameters values to be read, port management parameters to be set, port management parameter changes to subscribe or unsubscribe to, port management parameter-entry to be deleted and whether the TSN AF requests a list of port management parameters supported by the NW-TT in a port management list information element and include the list in a MANAGE PORT COMMAND.

Example 6 may include the network node of example 1 and/or any other example herein, the operations further comprising: encoding information related to user plane node management parameters values to be read, user plane node management parameters values to be set, user plane node management parameters changes to subscribe to, and unsubscribe from, user plane node management parameter-entry to be deleted, whether a list of user plane node management parameters supported by the NW-TT is requested in a user plane node management list information element, and includes the list in a MANAGE USER PLANE NODE COMMAND message; sending the MANAGE USER PLANE NODE COMMAND message to the NW-TT; and starting a timer.

Example 7 may include the network node of example 1 and/or any other example herein, wherein the NW-TT responds to initiating the network port management procedure with one or more instructions to: if the operation code is "selective read parameter," attempt to read the value of the selected sub-parameter of a parameter at a NW-TT port, and: if the value of the selected sub-parameter at the NW-TT port is read successfully, include the parameter with the selected sub-parameter and a current value in a port status information element of a MANAGE PORT COMPLETE message;

and if the value of the selected sub-parameter at the NW-TT port was not read successfully, include the parameter and associated port management service cause value in the port status information element of the MANAGE PORT COMPLETE message; if an operation code is "set parameter," attempt to set a value of the parameter at the NW-TT port to a value specified in the operation code; if the value of the parameter at the NW-TT port is set successfully, include the parameter and a current value in a port update result information element of the MANAGE PORT COMPLETE message; and if the value of the parameter at the NW-TT port was not set successfully, include the parameter and associated port management service cause value in the port update result information element of the MANAGE PORT COMPLETE message.

Example 8 may include the network node of example 1 and/or any other example herein, wherein the NW-TT responds to initiating the network port management procedure with one or more instructions to: if an operation code is "subscribe-notify for parameter," store a request to be notified of changes in the value of a corresponding parameter; if an operation code is "selective subscribe-notify for parameter," store a request to be notified of changes in the value of a corresponding sub-parameter of the parameter; if an operation code is "unsubscribe for parameter," delete a stored request to be notified of changes in a value of the corresponding parameter, if any; and if an operation code is "selective unsubscribe for parameter," delete a stored request to be notified of changes in a value of the corresponding sub-parameter of the parameter.

Example 9 may include the network node of example 1 and/or any other example herein, wherein the NW-TT responds to initiating the network port management procedure with one or more instructions to: respond to each operation included in a user plane node management list information element MANAGE USER PLANE NODE COMMAND message by: if the operation code is "selective read parameter," attempt to read the value of the selected sub-parameter of a user plane node management parameter at a NW-TT port, and: if the value of the selected sub-parameter at the NW-TT port is read successfully, include the parameter with the selected sub-parameter and their current value in a user plane node status information element of a MANAGE USER PLANE NODE COMPLETE message; and if the value of the selected sub-parameter at the NW-TT port was not read successfully, include the parameter and associated user plane node management service cause value in the user plane node status information element of the MANAGE USER PLANE NODE COMPLETE message; if the operation code is "selective subscribe-notify for parameter," store a request to be notified of changes in the value of a corresponding selected sub-parameter of the user plane node management parameter; if the operation code is "unsubscribe for parameter," delete the stored request to be notified of changes in the value of a corresponding user plane node management parameter, if any; if the operation code is "selective unsubscribe for parameter," delete the stored request to be notified of changes in the value of the corresponding selected sub-parameter of the user plane node parameter, if any; if the operation code is "delete parameter-entry," attempt to delete a referred parameter-entry of the parameter at the NW-TT; if the parameter-entry of the parameter at the NW-TT is deleted successfully, include the parameter and its current value in the user plane node update result information element of the MANAGE USER PLANE NODE COMPLETE message; if the parameter-entry of the parameter at the NW-TT was not deleted successfully, include the parameter and associated User plane node management service cause value in the user plane node update result information element of the MANAGE USER PLANE NODE COMPLETE message; and send the MANAGE USER PLANE NODE COMPLETE.

Example 10 may include the network node of example 1 and/or any other example herein, wherein a port management information list information element includes operation code octets in bits identifying selective read parameter as 00000110, selective subscribe-notify for parameter 00000111, selective unsubscribe for parameter 00001000, and delete parameter-entry 00001001.

Example 11 may include a user equipment (UE) comprising: at least one processor coupled to memory storing instructions that, when executed by the at least one processor, cause the UE to perform operations comprising: receiving at a device side time sensitive network (TSN) translator (DS-TT) user plane node information including a network request to initiate a port management procedure and port management information and user plane node management information; and deleting port management parameter entries at one or more ports located in the DS-TT, the deleted port management parameter entries to reduce a data structure size and enable deterministic time sensitive communication.

Example 12 may include the UE of example 11 and/or any other example herein, the operations further comprising: receiving a MANAGE PORT COMMAND message at the user equipment to initiate the port management procedure, the MANAGE PORT COMMAND message including encoded information related to port management parameter values to be read, set and deleted; and responding to the MANAGE PORT COMMAND message by the DS-TT by: if an operation code is "selective read parameter," attempt to read a value of a selected sub-parameter of a parameter at a DS-TT port, and: if the value of the selected sub-parameter at the DS-TT port is read successfully, include the value of the selected sub-parameter and a current value in a port status information element of a MANAGE PORT COMPLETE message; and, if the selected sub-parameter at the DS-TT port was not read successfully, include the parameter and an associated port management service cause value in the port status information element of the MANAGE PORT COMPLETE message.

Example 12 may include the UE of example 11 and/or any other example herein, the operations further comprising: receiving a MANAGE PORT COMMAND message at the user equipment to initiate the port management procedure, the MANAGE PORT COMMAND message including encoded information related to port management parameter values to be read, set and deleted; and responding to the MANAGE PORT COMMAND message by the DS-TT by: if the operation code is "selective-subscribe-notify for parameter," store the network request to be notified of changes in the parameter value identified by corresponding sub-parameters of the parameter; if the operation code is "selective unsubscribe for parameter," delete the stored request to be notified of changes in value of a corresponding selected sub-parameter of the parameter; if the operation code is "selective unsubscribe for parameter," delete the stored request to be notified of changes in the value of the corresponding selected sub-parameter of the parameter, if any.

Example 13 may include the UE of example 11 and/or any other example herein, the operations further comprising: receiving a MANAGE PORT COMMAND message at the user equipment to initiate the port management procedure, the MANAGE PORT COMMAND message including encoded information related to port management parameter values to be read, set and deleted.

Example 14 may include the UE of example 14 and/or any other example herein, the operations further comprising: responding to the MANAGE PORT COMMAND message by the DS-TT by: if an operation code is “delete parameter-entry,” attempt to delete the parameter-entry of the parameter at the DS-TT port; and if the parameter-entry of the parameter at the DS-TT port is deleted successfully, include the parameter and a current value in a port update result information element of a MANAGE PORT COMPLETE message; and if the parameter-entry of the parameter at the DS-TT port was not set successfully, include the parameter and an associated port management service cause value in a port update result information element of the MANAGE PORT COMPLETE message.

Example 15 may include a network node supporting time synchronization services in a wireless time sensitive communication (TSC) network comprising: a transceiver configured to: receive an encoded message from an application function (AF) information related to user plane node management parameters values to be read, user plane node management parameters values to be set, user plane node management parameters changes to subscribe to, and unsubscribe from, user plane node management parameter-entry to be deleted and whether a list of user plane node management parameters supported by a network-side TNS translator (NW-TT) is requested in a user plane node management list information element and includes the list in a MANAGE USER PLANE NODE COMMAND message; and receive the MANAGE USER PLANE NODE COMMAND message at the NW-TT.

Example 16 may include the network node of example 15 and/or any other example herein, further comprising: a memory coupled to the transceiver, the memory configured to store computer-executable instructions; and a processor coupled to the memory, the processor configured to access the memory and execute the computer-executable instructions to start a timer.

Example 17 may include the network node of example 15 and/or any other example herein, wherein the NW-TT responds initiating a network port management procedure with one or more instructions to: if an operation code is “selective read parameter,” attempt to read the value of the selected sub-parameter of a parameter at a NW-TT port, and: if the value of the selected sub-parameter at the NW-TT port is read successfully, include the parameter with the selected sub-parameter and a current value in a port status information element of a MANAGE PORT COMPLETE message; and if the value of the selected sub-parameter at the NW-TT port was not read successfully, include the parameter and associated port management service cause value in the port status information element of the MANAGE PORT COMPLETE message; if an operation code is “set parameter,” attempt to set a value of the parameter at the NW-TT port to a value specified in the operation code; if the value of the parameter at the NW-TT port is set successfully, include the parameter and a current value in a port update result information element of the MANAGE PORT COMPLETE message; and if the value of the parameter at the NW-TT port was not set successfully, include the parameter and associated port management service cause value in the port update result information element of the MANAGE PORT COMPLETE message.

Example 18 may include a method for a network node, the method comprising: receiving at the network node an encoded message from a time sensitive network application function (TSN AF) information related to user plane node management parameters values to be read, user plane node management parameters values to be set, user plane node management parameters changes to subscribe to, and unsubscribe from, user plane node management parameter-entry to be deleted and whether a list of user plane node management parameters supported by a network-side TNS translator (NW-TT) is requested in a user plane node management list information element and includes the list in a MANAGE USER PLANE NODE COMMAND message; receiving the MANAGE USER PLANE NODE COMMAND message at the NW-TT; and starting a timer.

Example 19 may include the method of example 18 and/or any other example herein, wherein the NW-TT responds to initiating a network port management procedure with one or more instructions to: if an operation code is “selective read parameter,” attempt to read the value of the selected sub-parameter of a parameter at a NW-TT port, and: if the value of the selected sub-parameter at the NW-TT port is read successfully, include the parameter with the selected sub-parameter and a current value in a port status information element of a MANAGE PORT COMPLETE message; and if the value of the selected sub-parameter at the NW-TT port was not read successfully, include the parameter and associated port management service cause value in the port status information element of the MANAGE PORT COMPLETE message; if an operation code is “set parameter,” attempt to set a value of the parameter at the NW-TT port to a value specified in the operation code; if the value of the parameter at the NW-TT port is set successfully, include the parameter and a current value in a port update result information element of the MANAGE PORT COMPLETE message; and if the value of the parameter at the NW-TT port was not set successfully, include the parameter and associated port management service cause value in the port update result information element of the MANAGE PORT COMPLETE message.

Example 20 may include the method of example 18 and/or any other example herein, wherein the NW-TT responds to initiating a network port management procedure with one or more instructions to: if an operation code is “subscribe-notify for parameter,” store a request to be notified of changes in the value of a corresponding parameter; if an operation code is “selective subscribe-notify for parameter,” store a request from the TSN AF to be notified of changes in the value of a corresponding sub-parameter of the parameter; if an operation code is “unsubscribe for parameter,” delete a stored request from the TSN AF to be notified of changes in a value of the corresponding parameter, if any; and if an operation code is “selective unsubscribe for parameter,” delete a stored request to be notified of changes in a value of the corresponding sub-parameter of the parameter, if any.

Example 21 may include the method of example 18 and/or any other example herein, wherein the NW-TT responds to initiating a network port management procedure with one or more instructions to: respond to each operation included in a user plane node management list information element MANAGE USER PLANE NODE COMMAND message by: if the operation code is “selective read parameter,” attempt to read the value of the selected sub-parameter of the user plane node management parameter at a NW-TT port, and: if the value of the selected sub-parameter at the NW-TT port is read successfully, include the parameter with the selected sub-parameter and their current value in a user plane node status information element of a MANAGE USER PLANE NODE COMPLETE message; and if the value of the selected sub-parameter at the NW-TT port was not read successfully, include the parameter and associated user plane node management service cause value in the user plane node status information element of the MANAGE USER PLANE NODE COMPLETE message; if the operation code is "selective subscribe-notify for parameter," store a request to be notified of changes in the value of a corresponding selected sub-parameter of the user plane node management parameter; if the operation code is "unsubscribe for parameter," delete the stored request to be notified of changes in the value of a corresponding user plane node management parameter, if any; if the operation code is "selective unsubscribe for parameter," delete the stored request to be notified of changes in the value of the corresponding selected sub-parameter of the user plane node parameter, if any; if the operation code is "delete parameter-entry," attempt to delete a referred parameter-entry of the parameter at the NW-TT; if the parameter-entry of the parameter at the NW-TT is deleted successfully, include the parameter and its current value in the user plane node update result information element of the MANAGE USER PLANE NODE COMPLETE message; if the parameter-entry of the parameter at the NW-TT was not deleted successfully, include the parameter and associated User plane node management service cause value in the user plane node update result information element of the MANAGE USER PLANE NODE COMPLETE message; and send the MANAGE USER PLANE NODE COMPLETE to the TSN AF.

Example 22 may include a computer-readable storage medium comprising instructions to perform the method of any of examples 18-21.

Example 23 may include an apparatus comprising means for performing any of the methods of examples 18-21.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

TABLE 13

| Abbreviations | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital Expenditure |

TABLE 13-continued

| Abbreviations | |
|---|---|
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |

TABLE 13-continued

| Abbreviations | |
|---|---|
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, | DMRS Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance tableManagement Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |

TABLE 13-continued

| Abbreviations | |
|---|---|
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Special Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |

TABLE 13-continued

| Abbreviations | |
|---|---|
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |

TABLE 13-continued

| Abbreviations | |
|---|---|
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |

TABLE 13-continued

| Abbreviations | |
|---|---|
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |

TABLE 13-continued

| Abbreviations | |
|---|---|
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |

TABLE 13-continued

| Abbreviations | |
|---|---|
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, Qos Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |

TABLE 13-continued

| Abbreviations | |
|---|---|
| Rel | Release |
| REQ | REQuest |
| RF | Radio Frequency |
| RI | Rank Indicator |
| RIV | Resource indicator value |
| RL | Radio Link |
| RLC | Radio Link Control layer |
| RLC | AM RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MMES1 | for the control plane |
| S1-U | S1 for the user plane |
| S-GWS-RNTI | Serving Gateway SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |

TABLE 13-continued

| Abbreviations | |
|---|---|
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |

TABLE 13-continued

| Abbreviations | |
|---|---|
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SIN | R Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |

TABLE 13-continued

| Abbreviations | |
|---|---|
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VOIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | extensible Markup Language |
| XRES | EXpected user RESponse |
| XOR | exclusive OR |
| ZC | Zadoff-Chu |
| ZP | Zero Po |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like. The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The team "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

That which is claimed is:

1. A network node supporting time synchronization services in a wireless time sensitive communication (TSC) network comprising:

a memory configured to store computer-executable instructions; and a processor coupled to the memory, the processor configured to access the memory and execute the computer-executable instructions to:

initiate a network port management procedure for time synchronization services by exchanging user plane node information including port management information and user plane node management information with a centralized network configuration (CNC), the port management information related to one or more ports located in a device side time sensitive network (TSN) translator (DS-TT) in a user equipment and a network-side TNS translator (NW-TT) in a network node;

encode information related to port management parameter values to be read, set and deleted by the DS-TT and the NW-TT in the network node, wherein if an operation code is "selective read parameter," perform reading a value of a parameter subset identified by a selected sub-parameter of a parameter at the DS-TT port;

a transceiver configured to receive time synchronization services; and a transceiver coupled to the processor, the transceiver configured to transmit a deletion operation comprising an operation code set to "delete parameter-entry" to delete a specific of a plurality of port management parameter entries at the one or more ports located in the DS-TT and the NW-TT, wherein the transceiver is configured to transmit the deletion operation by transmitting a MANAGE PORT COMMAND message including a port management list information element comprising an operation code set to "delete parameter-entry" to instruct the DS-TT or the NW-TT to delete a parameter entry of a port management parameter at the one or more ports.

2. The network node of claim 1, wherein an application function (AF) is configured to initiate the network port management procedure by encoding information related to port management parameter values to be read, set and deleted in a MANAGE PORT COMMAND message to a user equipment using a policy control function (PCF) and a session management function (SMF).

3. The network node of claim 2, wherein the AF is configured to:

transmit a MANAGE PORT COMMAND message to the user equipment DS-TT with one or more instructions including:

if an operation code is "selective read parameter," attempt to read a value of a selected sub-parameter of a parameter at the DS-TT port, and if a value of the selected sub-parameter at the DS-TT port is read successfully, include the value of the selected sub-parameter and a current value in a port status information element of a MANAGE PORT COMPLETE message; and if the selected sub-parameter at the DS-TT port was not read successfully, include the parameter and an associated port management service cause value in the port status information element of the MANAGE PORT COMPLETE message.

4. The network node of claim 2, wherein the AF is configured to:

transmit a MANAGE PORT COMMAND message to the user equipment DS-TT with one or more instructions including:

if an operation code is "subscribe-notify for parameter," store the network request from the AF to be notified of changes in the parameter value identified by a corresponding selected sub-parameter of the parameter;

if the operation code is "selective-subscribe-notify for parameter," store the request from the AF to be notified of changes in the value of the corresponding selected sub-parameter of the parameter; and if the operation code is "selective unsubscribe for parameter," delete the stored request from the AF to be notified of changes in value of a corresponding selected sub-parameter of the parameter.

5. The network node of claim 1, wherein the transmitting the deletion operation includes transmitting one or more instructions configured to:

delete a port management parameter entry at a NW-TT port; and encode the port management information about port management parameters values to be read, port management parameters to be set, port management parameter changes to subscribe or unsubscribe to, port management parameter-entry to be deleted and whether a list of port management parameters supported by the NW-TT has been requested in a port management list information element and include the list in a MANAGE PORT COMMAND.

6. The network node of claim 1, the operations further comprising:

encoding, information related to user plane node management parameters values to be read, user plane node management parameters values to be set, user plane node management parameters changes to subscribe to, and unsubscribe from, user plane node management parameter-entry to be deleted, whether a list of user plane node management parameters supported by the NW-TT has been requested in a user plane node management list information element, and includes the list in a MANAGE USER PLANE NODE COMMAND message;

sending the MANAGE USER PLANE NODE COMMAND message to the NW-TT; and starting a timer.

7. The network node of claim 1, wherein the NW-TT responds to the initiating the network port management procedure with one or more instructions to:

if the operation code is "selective read parameter," attempt to read the value of the selected sub-parameter of a parameter at a NW-TT port, and if the value of the selected sub-parameter at the NW-TT port is read successfully, include the parameter with the selected sub-parameter and a current value in a port status information element of a MANAGE PORT COMPLETE message; and if the value of the selected sub-parameter at the NW-TT port was not read successfully, include the parameter and associated port management service cause value in the port status information element of the MANAGE PORT COMPLETE message;

if an operation code is "set parameter," attempt to set a value of the parameter at the NW-TT port to a value specified in the operation code;

if the value of the parameter at the NW-TT port is set successfully, include the parameter and a current value in a port update result information element of the MANAGE PORT COMPLETE message; and if the value of the parameter at the NW-TT port was not set successfully, include the parameter and associated port management service cause value in the port update result information element of the MANAGE PORT COMPLETE message.

8. The network node of claim 1, wherein the NW-TT responds to the initiating the network port management procedure with one or more instructions to:

if an operation code is "subscribe-notify for parameter," store a request to be notified of changes in the value of a corresponding parameter;

if an operation code is "selective subscribe-notify for parameter," store a request to be notified of changes in the value of a corresponding sub-parameter of the parameter;

if an operation code is "unsubscribe for parameter," delete a stored request to be notified of changes in a value of the corresponding parameter; and if an operation code is "selective unsubscribe for parameter," delete a stored request to be notified of changes in a value of the corresponding sub-parameter of the parameter.

9. The network node of claim 1, wherein the NW-TT responds to the initiating the network port management procedure with one or more instructions to:

respond to each operation included in a user plane node management list information element MANAGE USER PLANE NODE COMMAND message by:

if the operation code is "selective read parameter," attempt to read the value of the selected sub-parameter of a user plane node management parameter at a NW-TT port, and if the value of the selected sub-parameter at the NW-TT port is read successfully, include the parameter with the selected sub-parameter and their current value in a user plane node status information element of a MANAGE USER PLANE NODE COMPLETE message; and if the value of the selected sub-parameter at the NW-TT port was not read successfully, include the parameter and associated user plane node management service cause value in the user plane node status information element of the MANAGE USER PLANE NODE COMPLETE message;

if the operation code is "selective subscribe-notify for parameter," store a request to be notified of changes in the value of a corresponding selected sub-parameter of the user plane node management parameter;

if the operation code is "unsubscribe for parameter," delete the stored request to be notified of changes in the value of a corresponding user plane node management parameter;

if the operation code is "selective unsubscribe for parameter," delete the stored request to be notified of changes in the value of the corresponding selected sub-parameter of the user plane node parameter;

if the operation code is "delete parameter-entry," attempt to delete a referred parameter-entry of the parameter at the NW-TT;

if the parameter-entry of the parameter at the NW-TT is deleted successfully, include the parameter and its current value in the user plane node update result information element of the MANAGE USER PLANE NODE COMPLETE message;

if the parameter-entry of the parameter at the NW-TT was not deleted successfully, include the parameter and associated User plane node management service cause value in the user plane node update result information element of the MANAGE USER PLANE NODE COMPLETE message; and send the MANAGE USER PLANE NODE COMPLETE.

10. A user equipment (UE) comprising:

at least one processor coupled to memory storing instructions that, when executed by the at least one processor, cause the UE to perform operations comprising:

receiving at a device side time sensitive network (TSN) translator (DS-TT) user plane node information including a network request to initiate a port management procedure and port management information and user plane node management information from an application function (AF), wherein the receiving comprises receiving a MANAGE PORT COMMAND message including a port management list information element comprising an operation code set to "delete parameter-entry" to instruct the DS-TT to delete a parameter entry of a port management parameter at the one or more ports; and responding to the MANAGE PORT COMMAND message by the DS-TT by deleting port management parameter entries at one or more ports located in the DS-TT if the operation code is "delete parameter-entry".

11. The UE of claim 10, the operations further comprising:

receiving a MANAGE PORT COMMAND message at the user equipment from the AF to initiate the port management procedure, the MANAGE PORT COMMAND message including encoded information related to port management parameter values to be read, set and deleted; and responding to the MANAGE PORT COMMAND message by the DS-TT by:

if an operation code is "selective read parameter," attempt to read a value of a selected sub-parameter of a parameter at a DS-TT port, and if the value of the selected sub-parameter at the DS-TT port is read successfully, include the value of the selected sub-parameter and a current value in a port status information element of a MANAGE PORT COMPLETE message; and if the selected sub-parameter at the DS-TT port was not read successfully, include the parameter and an associated port management service cause value in the port status information element of the MANAGE PORT COMPLETE message.

12. The UE of claim 10, the operations further comprising:

receiving a MANAGE PORT COMMAND message at the user equipment from the AF to initiate the port management procedure, the MANAGE PORT COMMAND message including encoded information related to port management parameter values to be read, set and deleted; and responding to the MANAGE PORT COMMAND message by the DS-TT by:

if the operation code is "selective-subscribe-notify for parameter," store the network request from the AF to be notified of changes in the parameter value identified by corresponding sub-parameters of the parameter;

if the operation code is "selective unsubscribe for parameter," delete the stored request from the AF to be notified of changes in value of a corresponding selected sub-parameter of the parameter; and if the operation code is "selective unsubscribe for parameter," delete the stored request from the AF to be notified of changes in the value of the corresponding selected sub-parameter of the parameter.

13. The UE of claim 10, the operations further comprising:

receiving a MANAGE PORT COMMAND message at the user equipment from the AF to initiate the port management procedure, the MANAGE PORT COMMAND message including encoded information related to port management parameter values to be read, set and deleted; and responding to the MANAGE PORT COMMAND message by the DS-TT by:

if an operation code is "delete parameter-entry," attempt to delete the parameter-entry of the parameter at the DS-TT port; and if the parameter-entry of the parameter at the DS-TT port is deleted successfully, include the parameter and a current value in a port update result information element of a MANAGE PORT COMPLETE message; and if the parameter-entry of the parameter at the DS-TT port was not set successfully, include the parameter and an associated port management service cause value in a port update result information element of the MANAGE PORT COMPLETE message.

14. A network node supporting time synchronization services in a wireless time sensitive communication (TSC) network comprising:

a transceiver configured to:

receive an encoded message from an application function (AF) information related to user plane node management parameters values to be read, user plane node management parameters values to be set, user plane node management parameters changes to subscribe to, and unsubscribe from, a selective user plane node management parameter-entry to be deleted wherein the user plane node management list information element comprises an operation code set to "delete parameter-entry" and whether the AF requests a list of user plane node management parameters supported by a network-side TNS translator (NW-TT) in a user plane node management list information element and includes the list in a MANAGE USER PLANE NODE COMMAND message; and receive the MANAGE USER PLANE NODE COMMAND message at the NW-TT.

15. The network node of claim 14, further comprising:

a memory coupled to the transceiver, the memory configured to store computer-executable instructions; and a processor coupled to the memory, the processor configured to access the memory and execute the computer-executable instructions to start a timer.

16. The network node of claim 14, wherein the NW-TT responds to the AF initiating a network port management procedure with one or more instructions to:

if an operation code is "selective read parameter," attempt to read the value of the selected sub-parameter of a parameter at a NW-TT port, and if the value of the selected sub-parameter at the NW-TT port is read successfully, include the parameter with the selected sub-parameter and a current value in a port status information element of a MANAGE PORT COMPLETE message; and if the value of the selected sub-parameter at the NW-TT port was not read successfully, include the parameter and associated port management service cause value in the port status information element of the MANAGE PORT COMPLETE message;

if an operation code is "set parameter," attempt to set a value of the parameter at the NW-TT port to a value specified in the operation code;

if the value of the parameter at the NW-TT port is set successfully, include the parameter and a current value in a port update result information element of the MANAGE PORT COMPLETE message; and if the value of the parameter at the NW-TT port was not set successfully, include the parameter and associated port management service cause value in the port update result information element of the MANAGE PORT COMPLETE message.

* * * * *